(12) United States Patent
Hombroek et al.

(10) Patent No.: US 11,866,868 B2
(45) Date of Patent: Jan. 9, 2024

(54) LAUNDRY WASHING MACHINE COLOR COMPOSITION ANALYSIS WITH ARTICLE ALERTS

(71) Applicant: Midea Group Co., Ltd., Foshan (CN)

(72) Inventors: Phillip C. Hombroek, Prospect, KY (US); Abubakar Abukar, Louisville, KY (US); Christopher G. Hoppe, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 405 days.

(21) Appl. No.: 17/126,095

(22) Filed: Dec. 18, 2020

(65) Prior Publication Data

US 2022/0195653 A1 Jun. 23, 2022

(51) Int. Cl.
*D06F 34/18* (2020.01)
*G06T 7/90* (2017.01)
*D06F 105/60* (2020.01)
*D06F 103/02* (2020.01)

(52) U.S. Cl.
CPC ............. *D06F 34/18* (2020.02); *G06T 7/90* (2017.01); *D06F 2103/02* (2020.02); *D06F 2105/60* (2020.02)

(58) Field of Classification Search
CPC .. D06F 34/18; D06F 2105/60; D06F 2103/02; G06T 7/90
USPC .......................................... 382/162
See application file for complete search history.

(56) References Cited

U.S. PATENT DOCUMENTS

| | | | |
|---|---|---|---|
| 4,257,708 | A | 3/1981 | Fukuda |
| 4,889,644 | A | 12/1989 | Amberg et al. |
| 4,986,093 | A | 1/1991 | Pastryk et al. |
| 4,987,627 | A | 1/1991 | Cur et al. |
| 5,031,427 | A | 7/1991 | Pastryk et al. |
| 5,161,393 | A | 11/1992 | Payne et al. |
| 5,167,722 | A | 12/1992 | Pastryk et al. |
| 5,373,714 | A | 12/1994 | Wada |
| 5,555,583 | A | 9/1996 | Berkcan |
| 5,560,060 | A | 10/1996 | Dausch et al. |
| 5,589,935 | A | 12/1996 | Biard |
| 5,603,233 | A | 2/1997 | Erickson et al. |

(Continued)

FOREIGN PATENT DOCUMENTS

| | | |
|---|---|---|
| CN | 1378005 A | 11/2002 |
| CN | 101484626 A | 9/2009 |

(Continued)

OTHER PUBLICATIONS

Transmittal of Related Applications dated Dec. 23, 2020.

(Continued)

*Primary Examiner* — Gabriel I Garcia
(74) *Attorney, Agent, or Firm* — Gray Ice Higdon

(57) ABSTRACT

A laundry washing machine and method detect the presence of outlier articles in a load of articles added to a wash tub based in part on color composition data collected from the load of articles using a color detection sensor. In some instances, color composition data may be used to generate an alert to a user to notify the user that an outlier article is potentially present in the load, and in some instances, color compensation data may be used to modify a load type selection to account for the presence of an outlier article in the load.

20 Claims, 14 Drawing Sheets

(56) References Cited

U.S. PATENT DOCUMENTS

| | | |
|---|---|---|
| 5,611,867 A | 3/1997 | Cooper et al. |
| 5,731,868 A | 3/1998 | Okey et al. |
| 5,737,790 A | 4/1998 | Badger et al. |
| 5,739,534 A | 4/1998 | Estenson et al. |
| 5,768,729 A | 6/1998 | Cracraft |
| 5,897,672 A | 4/1999 | Badami et al. |
| 6,023,950 A | 2/2000 | Battistella |
| 6,536,243 B2 | 3/2003 | Sasano |
| 6,599,712 B1 | 7/2003 | Sakakibara et al. |
| 6,784,997 B2 | 8/2004 | Lorenz et al. |
| 6,842,929 B2 | 1/2005 | Kim et al. |
| 7,062,810 B2 | 6/2006 | Hardaway et al. |
| 7,380,303 B2 | 6/2008 | Bellinetto et al. |
| 7,392,813 B2 | 7/2008 | Bertram et al. |
| 7,400,407 B2 | 7/2008 | Ng et al. |
| 7,421,752 B2 | 9/2008 | Donadon et al. |
| 7,451,510 B2 | 11/2008 | Lee |
| 7,570,809 B1 | 8/2009 | Srinivasa |
| 7,904,985 B2 | 3/2011 | Hendrickson et al. |
| 7,958,584 B2 | 6/2011 | Suel, II et al. |
| 8,108,063 B2 | 1/2012 | Agrawal et al. |
| 8,505,139 B2 | 8/2013 | Vanhazebrouck et al. |
| 8,528,229 B2 | 9/2013 | Ashrafzadeh et al. |
| 8,528,230 B2 | 9/2013 | Ashrafzadeh et al. |
| 8,627,524 B2 | 1/2014 | Urbanet et al. |
| 8,719,985 B2 | 5/2014 | Park et al. |
| 8,834,646 B2 | 9/2014 | Bewley, Jr. |
| 8,910,335 B2 | 12/2014 | Kim et al. |
| 8,976,126 B2 | 3/2015 | Kim et al. |
| 9,139,946 B2 | 9/2015 | Dogan et al. |
| 9,243,987 B2 | 1/2016 | Chanda et al. |
| 9,367,058 B2 | 6/2016 | Kang et al. |
| 9,412,038 B1 | 8/2016 | Koven et al. |
| 9,430,500 B2 | 8/2016 | Choi et al. |
| 9,453,299 B2 | 9/2016 | Park et al. |
| 9,534,338 B2 | 1/2017 | Fagstad et al. |
| 9,818,007 B1 | 11/2017 | Bajovic |
| 10,400,378 B2 | 9/2019 | Driussi |
| 10,612,175 B2 | 4/2020 | Hombroek |
| 10,619,286 B2 | 4/2020 | Pesavento et al. |
| 2001/0002542 A1 | 6/2001 | Sasano |
| 2003/0196278 A1 | 10/2003 | Durfee |
| 2004/0244433 A1 | 12/2004 | Lee et al. |
| 2005/0022317 A1 | 2/2005 | Shaffer |
| 2005/0166334 A1 | 8/2005 | Clouser |
| 2007/0299545 A1 | 12/2007 | Agrawal et al. |
| 2008/0041115 A1 | 2/2008 | Kanazawa et al. |
| 2008/0236208 A1 | 10/2008 | Miyata et al. |
| 2008/0276655 A1 | 11/2008 | Luckman et al. |
| 2008/0276964 A1 | 11/2008 | Hendrickson et al. |
| 2008/0276965 A1 | 11/2008 | Aykroyd et al. |
| 2010/0095465 A1 | 4/2010 | Kim et al. |
| 2010/0205820 A1 | 8/2010 | Ashrafzadeh et al. |
| 2012/0013940 A1* | 1/2012 | Miyazaki ............ G06F 3/1212 358/1.15 |
| 2012/0060299 A1 | 3/2012 | Kim et al. |
| 2012/0103026 A1 | 5/2012 | Oyama et al. |
| 2012/0110747 A1 | 5/2012 | Yum et al. |
| 2012/0312055 A1 | 12/2012 | Fagstad et al. |
| 2013/0125595 A1 | 5/2013 | Seo et al. |
| 2013/0239337 A1 | 9/2013 | Kim et al. |
| 2013/0312202 A1 | 11/2013 | Balinski et al. |
| 2014/0018962 A1 | 1/2014 | Jung et al. |
| 2014/0259441 A1 | 1/2014 | Fulmer et al. |
| 2014/0123400 A1 | 5/2014 | Gasparini et al. |
| 2014/0123403 A1 | 5/2014 | Zattin et al. |
| 2014/0241354 A1 | 8/2014 | Shuman et al. |
| 2014/0326067 A1 | 11/2014 | Chanda et al. |
| 2014/0326517 A1 | 11/2014 | Gomez |
| 2014/0352077 A1 | 12/2014 | Leitert et al. |
| 2014/0352078 A1* | 12/2014 | Leitert ............ D06F 34/18 8/137 |
| 2015/0000047 A1 | 1/2015 | Obregon |
| 2015/0007394 A1 | 1/2015 | Ashrafzadeh et al. |
| 2016/0119520 A1 | 4/2016 | Park |
| 2016/0160432 A1 | 6/2016 | Ashrafzadeh et al. |
| 2016/0379176 A1 | 12/2016 | Brailovskiy et al. |
| 2018/0087198 A1 | 3/2018 | Kim et al. |
| 2019/0093276 A1 | 3/2019 | Hombroek |
| 2019/0264372 A1 | 8/2019 | Kessler et al. |
| 2019/0352834 A1 | 11/2019 | Clara et al. |
| 2020/0071871 A1 | 3/2020 | Kim et al. |
| 2021/0207304 A1 | 7/2021 | Kim et al. |
| 2022/0195650 A1 | 6/2022 | Hombroek et al. |
| 2022/0195652 A1 | 6/2022 | Hombroek et al. |

FOREIGN PATENT DOCUMENTS

| | | |
|---|---|---|
| CN | 201605453 U | 10/2010 |
| CN | 101935936 A | 1/2011 |
| CN | 102199854 A | 9/2011 |
| CN | 102199855 A | 9/2011 |
| CN | 102260981 A | 11/2011 |
| CN | 102272370 A | 12/2011 |
| CN | 102505414 A | 6/2012 |
| CN | 103237935 A | 8/2013 |
| CN | 103306096 A | 9/2013 |
| CN | 103334257 | 10/2013 |
| CN | 103334258 | 10/2013 |
| CN | 103485121 A | 1/2014 |
| CN | 203514043 | 4/2014 |
| CN | 103797175 A | 5/2014 |
| CN | 103898711 | 7/2014 |
| CN | 104233700 A | 12/2014 |
| CN | 104790179 A | 7/2015 |
| CN | 105063956 | 11/2015 |
| CN | 204898342 U | 12/2015 |
| CN | 105862324 A | 8/2016 |
| CN | 104195787 B | 1/2017 |
| CN | 205975093 U | 2/2017 |
| CN | 106012430 B | 8/2018 |
| CN | 105841817 B | 10/2018 |
| CN | 108570800 B | 7/2020 |
| DE | 2844755 | 4/1980 |
| DE | 102008055643 A1 | 5/2010 |
| DE | 102010029890 A1 | 12/2011 |
| DE | 102014113252 A1 | 3/2016 |
| EP | 0178031 | 4/1986 |
| EP | 0787848 A1 | 8/1997 |
| EP | 0962576 | 12/1999 |
| EP | 2518203 | 10/2012 |
| EP | 2623661 A1 | 8/2013 |
| EP | 2985381 A1 | 2/2016 |
| EP | 2035613 B1 | 8/2018 |
| ES | 2574554 A1 | 6/2016 |
| GB | 2262363 | 6/1993 |
| JP | 04054998 A | 6/1990 |
| JP | H0332699 A | 2/1991 |
| JP | H04122384 A | 4/1992 |
| JP | H06218183 A | 8/1994 |
| JP | H08141273 A | 6/1996 |
| JP | 2003190688 A | 7/2003 |
| JP | 2011200526 | 10/2011 |
| KR | 20140019551 A | 2/2014 |
| WO | 2007003593 | 1/2007 |
| WO | WO2008000812 A1 | 1/2008 |
| WO | WO2010076157 A1 | 7/2010 |
| WO | WO2012089605 A1 | 7/2012 |
| WO | WO2014125861 A1 | 1/2016 |
| WO | WO-2020050990 A1 * | 3/2020 ............ D06F 33/32 |

OTHER PUBLICATIONS

U.S. Patent and Trademark Office, Office Action issued in U.S. Appl. No. 17/126,093 dated Jan. 3, 2023.

Leveraging Lasers—Retrieved from: https://www.finisar.com/sites/default/files/resources/Appliance%20Design-VCSEL%20turbidity%20Sensor.pdf Dec. 21, 2015.

"Bosch's stain scanner knows what you spilled on your shirt last night" www.engadget.com dated Sep. 2, 2017.

"Marathon Laundry's Washer-Dryer is the Tesla of Appliances" www.wired.com dated Jan. 6, 2016.

(56) References Cited

OTHER PUBLICATIONS

"The secret of load detection in washing machines" http://blog.micro-epsilon.com dated Apr. 28, 2010.
"Washers & Dryers with Bosch Home Connect" www.bosch-home.co.uk retrieved on Mar. 21, 2017.
International Search Report and Written Opinion issued in Application No. PCT/CN2018/074256, dated Jul. 4, 2018.
U.S. Patent and Trademark Office, Office Action issued in related U.S. Appl. No. 15/718,938 dated Jul. 19, 2019.
U.S. Patent and Trademark Office, Office Action issued in related U.S. Appl. No. 15/718,938 dated Dec. 9, 2019.
U.S. Patent and Trademark Office, Notice of Allowance issued in U.S. Appl. No. 15/718,938 dated Feb. 24, 2020.
International Search Report and Written Opinion issued in Application No. PCT/CN2017/087805 dated Sep. 20, 2017.
International Search Report and Written Opinion issued in Application No. PCT/CN2017/087804 dated Sep. 4, 2017.
International Search Report and Written Opinion issued in Application No. PCT/CN2017/087800 dated Jul. 27, 2017.
International Search Report and Written Opinion issued in Application No. PCT/CN2017/087799 dated Sep. 13, 2017.
U.S. Patent and Trademark Office, Notice of Allowance issued in U.S. Appl. No. 16/423,933 dated Sep. 19, 2022.
U.S. Patent and Trademark Office, Office Action issued in U.S. Appl. No. 16/423,933 dated Mar. 7, 2022.
Bell, Spencer E., United States Patent and Trademark Office, Notice of Allowance in U.S. Appl. No. 17/126,093, 28 pages, dated May 23, 2023.

\* cited by examiner

LAUNDRY WASHING MACHINE COLOR COMPOSITION ANALYSIS WITH ARTICLE ALERTS

BACKGROUND

Laundry washing machines are used in many single-family and multi-family residential applications to clean clothes and other fabric items. Due to the wide variety of items that may need to be cleaned by a laundry washing machine, many laundry washing machines provide a wide variety of user-configurable settings to control various aspects of a wash cycle such as water temperatures and/or amounts, agitation, soaking, rinsing, spinning, etc. The settings cycle can have an appreciable effect on washing performance, as well as on energy and/or water consumption, so it is generally desirable for the settings used by a laundry washing machine to appropriately match the needs of each load washed by the machine.

Some laundry washing machines also support user selection of load types, typically based on the types of fabrics and/or items in the load. Some laundry washing machines, for example, have load type settings such as colors, whites, delicates, cottons, permanent press, towels, bedding, heavily soiled items, etc. These manually-selectable load types generally represent specific combinations of operational settings that are optimized for particular load types so that a user is not required to select individual values for each of the controllable operational settings of a laundry washing machine.

While manual load type selection in many cases simplifies a user's interaction with a laundry washing machine, such manual selection still can lead to suboptimal performance due to, for example, user inattentiveness or lack of understanding. Therefore, a significant need continues to exist in the art for manners of optimizing the performance of a laundry washing machine for different types of loads, as well as reducing the burden on users when interacting with a laundry washing machine.

Further, while various control methodologies may be developed to optimize laundry washing machine performance, a significant challenge associated with such methodologies is the varied environments within which laundry washing machines may be installed, as a control methodology and/or the operational settings used thereby that are optimized for particular environmental conditions may not be optimal for installations that depart significantly from those environmental conditions. Therefore, a significant need also exists in the art for a manner of adapting the control methodologies and/or operational settings that may be used to optimize laundry washing machine performance for use in different installations.

SUMMARY

The invention addresses these and other problems associated with the art by providing a laundry washing machine and method that detect the presence of outlier articles in a load of articles added to a wash tub based in part on color composition data collected from the load of articles using a color detection sensor. In some instances, color composition data may be used to generate an alert to a user to notify the user that an outlier article is potentially present in the load, and in some instances, color compensation data may be used to modify a load type selection to account for the presence of an outlier article in the load.

Therefore, consistent with one aspect of the invention, a laundry washing machine may include a wash tub disposed within a housing, a color detection sensor positioned to capture color composition data of a load of articles over time as the load of articles is added to the wash tub, and a controller coupled to the color detection sensor and configured to initiate the capture of the color composition data with the color detection sensor as the load of articles is added to the wash tub, the controller further configured to initiate a color decision algorithm to characterize the captured color composition data by assigning each of a plurality of pixel values in the captured color composition data to one of a plurality of color categories, where the controller is further configured to generate an alert in response to detection of one or more outlier articles from the load of articles added to the wash tub in the categorized color composition data.

In addition, in some embodiments, the controller is configured to initiate the color decision algorithm by executing at least a portion of the color decision algorithm. Further, in some embodiments, the controller is configured to initiate the color decision algorithm by communicating data from the plurality of color composition data captures to a remote device that executes at portion of the color decision algorithm, and the controller is further configured to receive result data associated with the color decision algorithm from the remote device. Moreover, in some embodiments, the color decision algorithm is configured to assign each of the plurality of pixels in the captured color composition data to one of the plurality of color categories by comparing color data for each pixel against a plurality of thresholds associated with the plurality of color categories. Further, in some embodiments, the color decision algorithm is configured to determine a number of pixels in the captured color composition data that are assigned to each of the plurality of color categories, and to characterize the load of articles based upon the determined numbers of pixels.

In some embodiments, the color decision algorithm is configured to characterize the load of articles based upon the determined numbers of pixels by comparing the determined numbers of pixels against thresholds associated with one or more of the plurality of color categories. Moreover, in some embodiments, the color decision algorithm is configured to detect the one or more outlier articles based upon a determined number of pixels assigned to a different color category from that to which the load of articles is assigned. Further, in some embodiments, the color decision algorithm is configured to detect the one or more outlier articles based upon a majority of the determined numbers of pixels being assigned to a first color category but the determined number of pixels assigned to the first color category not meeting a threshold associated with the first color category.

In addition, in some embodiments, the plurality of color categories to which the pixels are assigned includes a whites color category, a lights color category, and a darks color category, the color decision algorithm is configured to characterize the load of articles based upon the determined numbers of pixels by characterizing the load of articles as a whites load in response to a majority of the determined numbers of pixels being assigned to the whites color category and the determined number of pixels assigned to the whites color category meeting a whites threshold, characterizing the load of articles as a lights load in response to a majority of the determined numbers of pixels being assigned to the lights color category and the determined number of pixels assigned to the lights color category meeting a lights threshold, and characterizing the load of articles as a darks load in response to a majority of the determined numbers of pixels being assigned to the darks color category and the determined number of pixels assigned to the darks color category meeting a darks threshold, and the color decision algorithm is configured to detect the one or more outlier articles based upon the determined numbers of pixels by detecting the one or more outlier articles in response to a majority of the determined numbers of pixels being assigned to the whites color category but the determined number of pixels assigned to the whites color category not meeting the whites threshold, detecting the one or more outlier articles in response to a majority of the determined numbers of pixels being assigned to the lights color category but the determined number of pixels assigned to the lights color category not meeting the lights threshold, and detecting the one or more outlier articles in response to a majority of the determined numbers of pixels being assigned to the darks color category and the determined number of pixels assigned to the darks color category not meeting the darks threshold.

Also, in some embodiments, the controller is configured to generate the alert by generating an audible and/or visual alert with a user interface of the laundry washing machine.

Consistent with another aspect of the invention, a laundry washing machine may include a wash tub disposed within a housing, a color detection sensor positioned to capture color composition data of a load of articles over time as the load of articles is added to the wash tub, and a controller coupled to the color detection sensor and configured to initiate the capture of the color composition data with the color detection sensor as the load of articles is added to the wash tub, the controller further configured to initiate a color decision algorithm to characterize the captured color composition data by assigning each of a plurality of pixel values in the captured color composition data to one of a plurality of color categories, where the color decision algorithm is configured to automatically select a first color load type for the load based upon the categorized color composition data, and to select a second color load type for the load over the first color load type in response to detection of one or more outlier articles from the load of articles added to the wash tub in the categorized color composition data.

Moreover, in some embodiments, the controller is further configured to generate an alert in response to the detection of the one or more outlier articles from the load of articles added to the wash tub in the categorized color composition data. In some embodiments, the color decision algorithm is configured to assign each of the plurality of pixels in the captured color composition data to one of the plurality of color categories by comparing color data for each pixel against a plurality of thresholds associated with the plurality of color categories. Further, in some embodiments, the color decision algorithm is configured to determine a number of pixels in the captured color composition data that are assigned to each of the plurality of color categories, and to characterize the load of articles based upon the determined numbers of pixels. Also, in some embodiments, the color decision algorithm is configured to characterize the load of articles based upon the determined numbers of pixels by comparing the determined numbers of pixels against thresholds associated with one or more of the plurality of color categories.

Further, in some embodiments, the color decision algorithm is configured to select the second color load type for the load over the first color load type based upon a determined number of pixels assigned to a different color category from that associated with the first color load type. Also, in some embodiments, the color decision algorithm is configured to detect the one or more outlier articles based upon a majority of the determined numbers of pixels being assigned to a first color category but the determined number of pixels assigned to the first color category not meeting a threshold associated with the first color category.

In addition, in some embodiments, the plurality of color categories to which the pixels are assigned includes a whites color category, a lights color category, and a darks color category, the color decision algorithm is configured to characterize the load of articles based upon the determined numbers of pixels by characterizing the load of articles as a whites load in response to a majority of the determined numbers of pixels being assigned to the whites color category and the determined number of pixels assigned to the whites color category meeting a whites threshold, characterizing the load of articles as a lights load in response to a majority of the determined numbers of pixels being assigned to the lights color category and the determined number of pixels assigned to the lights color category meeting a lights threshold, and characterizing the load of articles as a darks load in response to a majority of the determined numbers of pixels being assigned to the darks color category and the determined number of pixels assigned to the darks color category meeting a darks threshold, and the color decision algorithm is configured to detect the one or more outlier articles based upon the determined numbers of pixels by detecting the one or more outlier articles in response to a majority of the determined numbers of pixels being assigned to the whites color category but the determined number of pixels assigned to the whites color category not meeting the whites threshold, detecting the one or more outlier articles in response to a majority of the determined numbers of pixels being assigned to the lights color category but the determined number of pixels assigned to the lights color category not meeting the lights threshold, and detecting the one or more outlier articles in response to a majority of the determined numbers of pixels being assigned to the darks color category and the determined number of pixels assigned to the darks color category not meeting the darks threshold.

Moreover, in some embodiments, the whites threshold is a first whites threshold and the darks threshold is a first darks threshold, and the color decision algorithm is further configured to characterize the load of articles as a lights load in response to a majority of the determined numbers of pixels being assigned to the whites color category but the determined number of pixels assigned to the whites color category not meeting a second whites threshold, and characterize the load of articles as a lights load in response to a majority of the determined numbers of pixels being assigned to the darks color category but the determined number of pixels assigned to the darks color category not meeting a second darks threshold.

Consistent with another aspect of the invention, a method of operating a laundry washing machine may include capturing color composition data of a load of articles as the load of articles is added to a wash tub using a color detection sensor, initiating a color decision algorithm to characterize the captured color composition data by assigning each of a plurality of pixel values in the captured color composition data to one of a plurality of color categories, detecting one or more outlier articles from the load of articles added to the wash tub in the categorized color composition data, and generating an alert and/or selecting a second color load type for the load over a first color load type in response to detection of one or more outlier articles from the load of articles added to the wash tub in the categorized color composition data.

Other embodiments may include various methods of operating a laundry washing machine utilizing the various operations described above.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
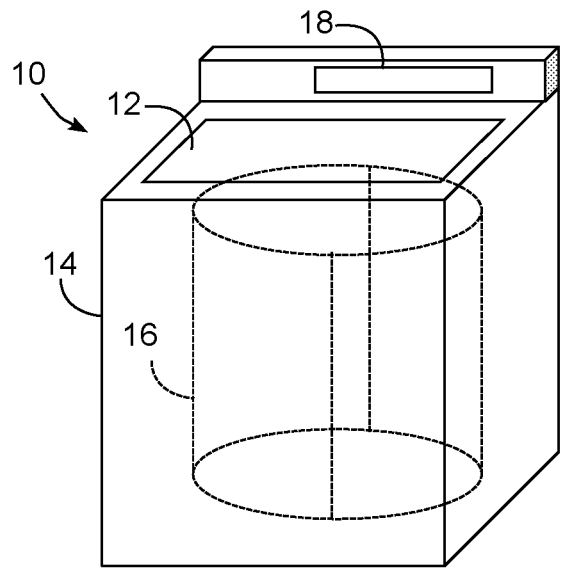
FIG. 1 is a perspective view of a top-load laundry washing machine consistent with some embodiments of the invention.

Embodiments consistent with the invention may be used in connection with automating the operation of a laundry washing machine. In particular, in some embodiments consistent with the invention, a laundry washing machine may include one or both of an absorption-based load type selection process and a color-based load type selection process that may be used separately or together to select a load type for a load disposed in a wash tub, and from the selected load type, determine one or more operational settings for a wash cycle performed by the laundry washing machine. In connection with such selection processes, article alerts and/or load type modifications may be generated in some embodiments in response to the detection of outlier articles in a load. Further, in some instances, various aspects of the selection processes may be calibrated for a particular installation of a laundry washing machine, e.g., based upon ambient lighting conditions, water supply pressure, and the weight of the wash tub itself.

In this regard, a load type may be considered to represent one of a plurality of different characteristics, categories, classes, subclasses, etc. that may be used to distinguish different loads from one another, and for which it may be desirable to define particular operational settings or combinations of operational settings for use in washing loads of that particular load type. In one embodiment discussed and illustrated hereinafter, load types may be distinguished based upon different fabric types or absorption characteristics (e.g., natural, cotton, wool, silk, synthetic, polyester, permanent press, wrinkle resistant, blends, etc.) and/or based upon color composition, e.g., (colors, darks, reds, whites, lights, mixed, etc.), and it will be appreciated that fabric types and color composition may be used together or separately in different embodiments (i.e., some embodiments may use only fabric types and some embodiments may use only color composition). Load types may also be based in some embodiments at least in part on different article types (e.g., garments, towels, bedding, delicates, etc.). In addition, separate load types may be used to represent fabric type and color composition in some embodiments, e.g., characterizing a load as a load of cotton whites or polyester darks, etc.

It will be appreciated, however, that load types may be defined based upon additional or alternative categorizations, e.g., durability (delicates, work clothes, etc.) and soil level (lightly soiled, normally soiled, heavily soiled loads, etc.), among others. Load types may also represent categories of loads that are unnamed, and that simply represent a combination of characteristics for which certain combinations of operational settings may apply, particularly as it will be appreciated that some loads may be unsorted and may include a combination of different items that themselves have different characteristics. Therefore, in some embodiments, a load type may be associated with a combination of operational settings that will be applied to a range of different loads that more closely match that load type over other possible load types.

An operational setting, in this regard, may include any number of different configurable aspects of a wash cycle performed by a laundry washing machine including, but not limited to, a wash water temperature, a rinse water temperature, a wash water amount, a rinse water amount, a speed or stroke of agitation during washing and/or rinsing, a spin speed, whether or not agitation is used during washing and/or rinsing, a duration of a wash, rinse, soak, or spin phase of a wash cycle, a number of repeats of a wash, rinse, soak or spin phase, selection between different rinse operation types such as a spray rinse operation or a deep fill rinse operation, pretreatment such as soaking over time with a prescribed water temperature and specific agitation stroke, etc.

As will become more apparent below, in some embodiments of the invention, a load type may be dynamically selected during or prior to an initial fill phase of a wash cycle, i.e., the phase of a wash cycle in which water is first introduced into a wash tub, and generally prior to any agitation of the load and/or draining of fluid from the wash tub, and generally without any extended soaking of the load. Thus, in contrast to some conventional approaches, load type selection may be performed in many embodiments with little or no delay in the initial fill phase, and thus, with little or no impact on the duration of the overall wash cycle. It will be appreciated, however, that in some embodiments, a load may be agitated or at least rotated during a portion of the initial fill phase, e.g., to facilitate a determination of the weight of the load.

Numerous variations and modifications will be apparent to one of ordinary skill in the art, as will become apparent from the description below. Therefore, the invention is not limited to the specific implementations discussed herein.

Turning now to the drawings, wherein like numbers denote like parts throughout the several views, FIG. 1 illustrates an example laundry washing machine 10 in which the various technologies and techniques described herein may be implemented. Laundry washing machine 10 is a top-load washing machine, and as such includes a top-mounted door 12 in a cabinet or housing 14 that provides access to a vertically-oriented wash tub 16 housed within the cabinet or housing 14. Door 12 is generally hinged along a side or rear edge and is pivotable between the closed position illustrated in FIG. 1 and an opened position (not shown). When door 12 is in the opened position, clothes and other washable items may be inserted into and removed from wash tub 16 through an opening in the top of cabinet or housing 14. Control over washing machine 10 by a user is generally managed through a control panel 18 disposed on a backsplash and implementing a user interface for the washing machine, and it will be appreciated that in different washing machine designs, control panel 18 may include various types of input and/or output devices, including various knobs, buttons, lights, switches, textual and/or graphical displays, touch screens, etc. through which a user may configure one or more settings and start and stop a wash cycle.

Figure 2:
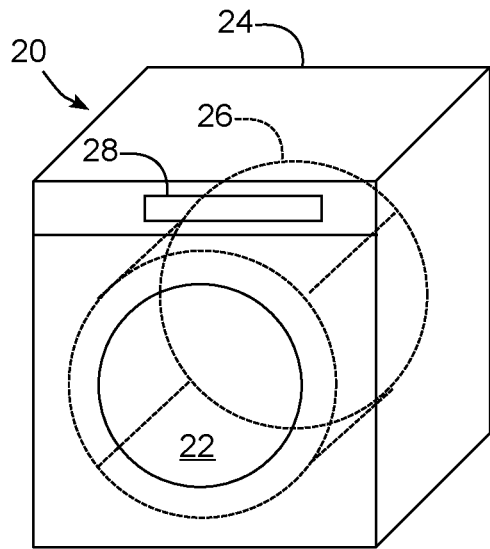
FIG. 2 is a perspective view of a front-load laundry washing machine consistent with some embodiments of the invention.

The embodiments discussed hereinafter will focus on the implementation of the hereinafter-described techniques within a top-load residential laundry washing machine such as laundry washing machine 10, such as the type that may be used in single-family or multi-family dwellings, or in other similar applications. However, it will be appreciated that the herein-described techniques may also be used in connection with other types of laundry washing machines in some embodiments. For example, the herein-described techniques may be used in commercial applications in some embodiments. Moreover, the herein-described techniques may be used in connection with other laundry washing machine configurations. FIG. 2, for example, illustrates a front-load laundry washing machine 20 that includes a front-mounted door 22 in a cabinet or housing 24 that provides access to a horizontally-oriented wash tub 26 housed within the cabinet or housing 24, and that has a control panel 28 positioned towards the front of the machine rather than the rear of the machine as is typically the case with a top-load laundry washing machine. Implementation of the herein-described techniques within a front-load laundry washing machine would be well within the abilities of one of ordinary skill in the art having the benefit of the instant disclosure, so the invention is not limited to the top-load implementation discussed further herein.

Figure 3:
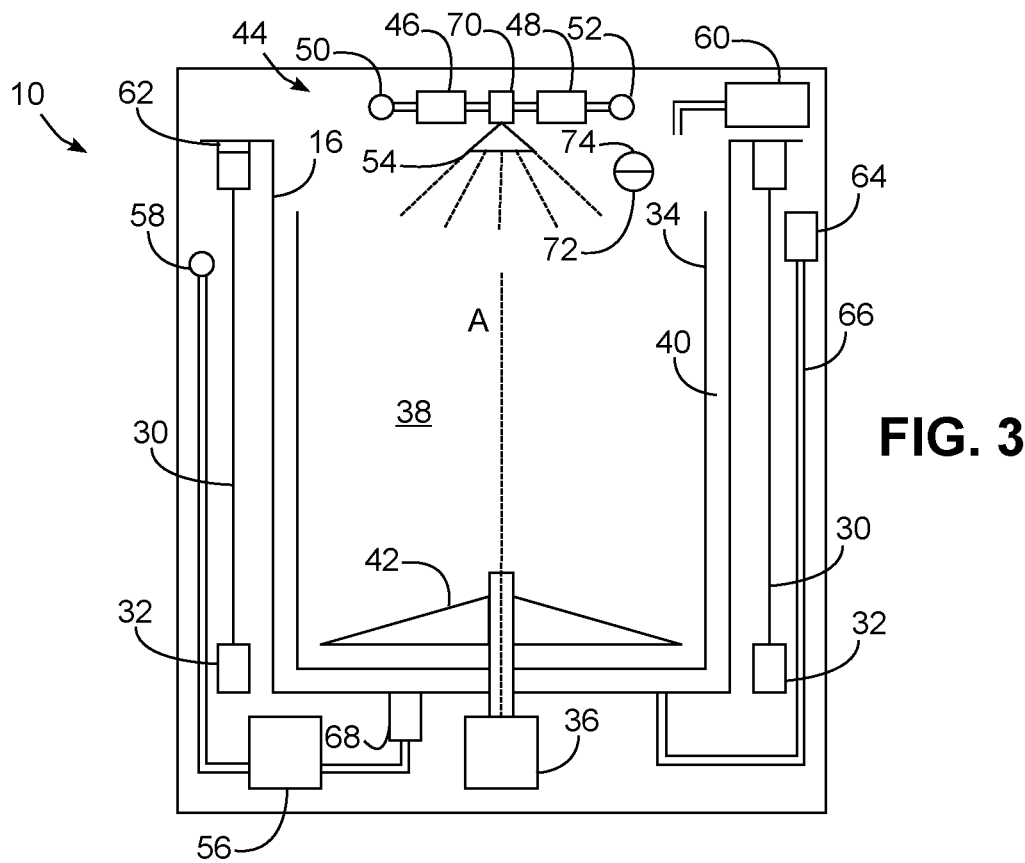
FIG. 3 is a functional vertical section of the laundry washing machine of FIG. 1.

FIG. 3 functionally illustrates a number of components in laundry washing machine 10 as is typical of many washing machine designs. For example, wash tub 16 may be vertically oriented, generally cylindrical in shape, opened to the top and capable of retaining water and/or wash liquor dispensed into the washing machine. Wash tub 16 may be supported by a suspension system such as a set of support rods 30 with corresponding vibration dampening springs 32.

Disposed within wash tub 16 is a wash basket 34 that is rotatable about a generally vertical axis A by a drive system 36. Wash basket 34 is generally perforated or otherwise provides fluid communication between an interior 38 of the wash basket 34 and a space 40 between wash basket 34 and wash tub 16. Drive system 36 may include, for example, an electric motor and a transmission and/or clutch for selectively rotating the wash basket 34. In some embodiments, drive system 36 may be a direct drive system, whereas in other embodiments, a belt or chain drive system may be used.

In addition, in some embodiments an agitator 42 such as an impeller, auger or other agitation element may be disposed in the interior 38 of wash basket 34 to agitate items within wash basket 34 during a washing operation. Agitator 42 may be driven by drive system 36, e.g., for rotation about the same axis as wash basket 34, and a transmission and/or clutch within drive system 36 may be used to selectively rotate agitator 42. In other embodiments, separate drive systems may be used to rotate wash basket 34 and agitator 42.

A water inlet 44 may be provided to dispense water into wash tub 16. In some embodiments, for example, hot and cold valves 46, 48 may be coupled to external hot and cold water supplies through hot and cold inlets 50, 52, and may output to one or more nozzles 54 to dispense water of varying temperatures into wash tub 16. In addition, a pump system 56, e.g., including a pump and an electric motor, may be coupled between a low point, bottom or sump in wash tub 16 and an outlet 58 to discharge greywater from wash tub 16. In some embodiments, it may be desirable to utilize multiple nozzles 54, and in some instances, oscillating nozzles 54, such that water dispensed into the wash tub is evenly distributed over the top surface of the load. As will become more apparent below, in some instances, doing so may maximize the amount of water absorbed by the load prior to water reaching the bottom of the wash tub and being sensed by a fluid level sensor.

In some embodiments, laundry washing machine 10 may also include a dispensing system 60 configured to dispense detergent, fabric softener and/or other wash-related products into wash tub 16. Dispensing system 60 may be configured in some embodiments to dispense controlled amounts of wash-related products, e.g., as may be stored in a reservoir (not shown) in laundry washing machine 10. In other embodiments, dispensing system 60 may be used to time the dispensing of wash-related products that have been manually placed in one or more reservoirs in the machine immediately prior to initiating a wash cycle. Dispensing system 60 may also, in some embodiments, receive and mix water with wash-related products to form one or more wash liquors that are dispensed into wash tub 16. In still other embodiments, no dispensing system may be provided, and a user may simply add wash-related products directly to the wash tub prior to initiating a wash cycle.

It will be appreciated that the particular components and configuration illustrated in FIG. 3 is typical of a number of common laundry washing machine designs. Nonetheless, a wide variety of other components and configurations are used in other laundry washing machine designs, and it will be appreciated that the herein-described functionality generally may be implemented in connection with these other designs, so the invention is not limited to the particular components and configuration illustrated in FIG. 3.

Further, to support various automated functionality described herein, laundry washing machine 10 also may also include one or more of sensors, including, among others, a weight sensor, a fluid level sensor, a turbidity sensor, a flow sensor, and/or a color detection sensor.

A weight sensor may be used to generate a signal that varies based in part on the mass or weight of the contents of wash tub 16. In the illustrated embodiment, for example, a weight sensor may be implemented in laundry washing machine 10 using a single load cell 62 coupled to one of the support rods 30, or alternatively on other structures supporting the wash tub, e.g., a leg, spring or damper. Load cell 62 may be an electro-mechanical sensor that outputs a signal that varies with a displacement based on load or weight, and thus outputs a signal that varies with the weight of the contents of wash tub 16. Multiple load cells 62 may be used in some embodiments, while in other embodiments, other types of transducers or sensors that generate a signal that varies with applied force, e.g., strain gauges, may be used. Furthermore, while a single load cell 62, which is offset from a rotational axis A of wash basket 34, is illustrated as supporting wash tub 16 on a support rod 30, the load cells, or other appropriate transducers or sensors, may be positioned elsewhere in a laundry washing machine to generate one or more signals that vary in response to the weight of the contents of wash tub 16. In some embodiments, for example, transducers may be used to support an entire load washing machine, e.g., one or more feet of a machine. Other types and/or locations of transducers suitable for generating a signal that varies with the weight of the contents of a wash tub will be apparent to one of ordinary skill in the art having the benefit of the instant disclosure. In addition, in some embodiments, a weight sensor may also be used for vibration sensing purposes, e.g., to detect excessive vibrations resulting from an out-of-balance load. In other embodiments, however, no vibration sensing may be used, while in other embodiments, separate sensors may be used to sense vibrations. Further, in some embodiments, a single load cell or other transducer may be used (e.g., disposed proximate a corner of the housing), and the wash basket may be rotated when sensing the weight of the load such that a weight may be determined by averaging multiple weight values captured during rotation of the wash basket.

A fluid level sensor may be used to generate a signal that varies with the level or height of fluid in wash tub 16. In the illustrated embodiment, for example, a fluid level sensor may be implemented using a pressure sensor 64 in fluid communication with a low point, bottom or sump of wash tub 16 through a tube 66 such that a pressure sensed by pressure sensor 64 varies with the level of fluid within the wash tub. It will be understood that the addition of fluid to the wash tub will generate a hydrostatic pressure within the tube that varies with the level of fluid in the wash tub, and that may be sensed, for example, with a piezoelectric or other transducer disposed on a diaphragm or other movable element. It will be appreciated that a wide variety of pressure sensors may be used to provide fluid level sensing, including, among others, combinations of pressure switches that trigger at different pressures. It will also be appreciated that fluid level in the wash tub may also be sensed using various non-pressure based sensors, e.g., optical sensors, laser sensors, etc.

Additional sensors may also be incorporated into laundry washing machine 10. For example, in some embodiments, a turbidity sensor 68 may be used to measure the turbidity or clarity of the fluid in wash tub 16, e.g., to sense the presence or relative amount of various wash-related products such as detergents or fabric softeners and/or to sense the presence or relative amount of soil in the fluid. Further, in some embodiments, turbidity sensor 68 may also measure other characteristics of the fluid in wash tub 16, e.g., conductivity and/or temperature. In other embodiments, separate sensors may be used to measure turbidity, conductivity and/or temperature, and further, other sensors may be incorporated to measure additional fluid characteristics. In other embodiments, no turbidity sensor may be used.

In addition, in some embodiments, a flow sensor 70 such as one or more flowmeters may be used to sense an amount of water dispensed into wash tub 16. In other embodiments, however, no flow sensor may be used. Instead, water inlet 44 may be configured with a static and regulated flow rate such that the amount of water dispensed is a product of the flow rate and the amount of time the water is dispensed. Therefore, in some embodiments, a timer may be used to determine the amount of water dispensed into wash tub 16. In addition, as will be discussed in greater detail below, in some instances a calibration process may be performed to determine a water supply pressure and thereby determine a corresponding flow rate from which the amount of water dispensed may be determined.

Furthermore, in some embodiments, a color detection sensor 72 may be used to sense the colors of items in a load to be washed by laundry washing machine 10. In some instances, color detection sensor 72 may be located proximate an opening of the wash tub 16 and may capture color composition data of one or more items. In such embodiments, color detection sensor 72 may capture the color composition data as the item(s) are added to the wash tub 16, and may be positioned in some embodiments with a field of view focused downwardly towards the bottom of the wash tub. In other embodiments, however, color detection sensor 72 may be oriented generally upwardly facing to capture color composition data of items prior to the items reaching the bottom of the wash tub. Other positions for color detection sensor 72 may be used in other embodiments, e.g., on a door, proximate a top edge of a door on a front-load laundry washing machine, and in other locations suitable for capturing data from items prior to, during, or after loading into a wash tub.

In some embodiments, color detection sensor 72 may be an image sensor, a camera, a spectrometer, or any other type of sensor or combination of sensors capable of capturing electromagnetic radiation in various spectra (including the visible light spectrum light in some embodiments, and in some embodiments, other spectra such as infrared, ultraviolet, etc.), and color composition data may be in any form that represents the electromagnetic radiation detected by the sensor. In some embodiments, for example, color detection sensor 72 may be a visible light camera or image sensor, and the color composition data may be in a form of one or more images or captures including two or three dimensional arrays of pixels representing color, intensity and/or other light characteristics. A color composition data capture may include a single image in some embodiments, while in other embodiments a color composition data capture may include a sequence of images or a sequence of frames from a video stream, among other alternatives.

In some embodiments, for example, color composition data may be in the form of one or more color models, including, but not limited to the RGB color model, the CMKY color model, or the like, and the color composition data may include arrays of numerical values representing intensities of different color components (for example, in the RGB color model the intensities of red, green, and/or blue) captured by color detection sensor 72. In some embodiments, color detection sensor 72 captures may be initiated in response to detection of a weight change resulting from one or more items being added to wash tub, e.g., as sensed by weight sensor 62. In other embodiments, color detection sensor 72 may continuously capture color composition data (e.g., in a video format) over a period of time, e.g., started and stopped based upon opening and closing of door 12.

In some embodiments, color detection sensor 72 may also be used to detect a stain on the item(s). In some embodiments, stain detection may be done in conjunction and/or simultaneously with capturing color composition data; while in other embodiments, stain detection and the capture of color composition data may be separate and discrete functions of color detection sensor 72. One or more parameters of the wash cycle may be configured based on the detection of a stain in some embodiments, e.g., to utilize a pretreatment, such as a soak, in order to aid in removing the stain, and in some embodiments, one or more characteristics of the detected stain may be determined, e.g., composition of the stain (e.g. oil, food, etc.), size of the stain, intensity or the stain, etc., with one or more wash cycle parameters adjusted based upon the determined characteristics of the stain. In still other embodiments, the use of a stain removal tool may be recommended (e.g., via a notification to a user via a user interface of the laundry washing machine or a mobile computing device) based on the characteristic(s) of the stain.

In some embodiments, a retractable cover 74 may selectively cover color detection sensor 72 and may be able to transition between covering and exposing substantially all of color detection sensor 72. In such embodiments, the retractable cover 74 may be configured to initiate automatic retraction in response to the open/closed status of door 12, and may be desirable where color detection sensor 72 is disposed within a location in the wash tub where it could be exposed to water, detergent, and the like during a wash cycle. Various retractable cover designs may be used, e.g., slidable planar covers, iris-type covers, pivotable covers, etc., while in other embodiments, no retractable cover may be used.

Figure 4:
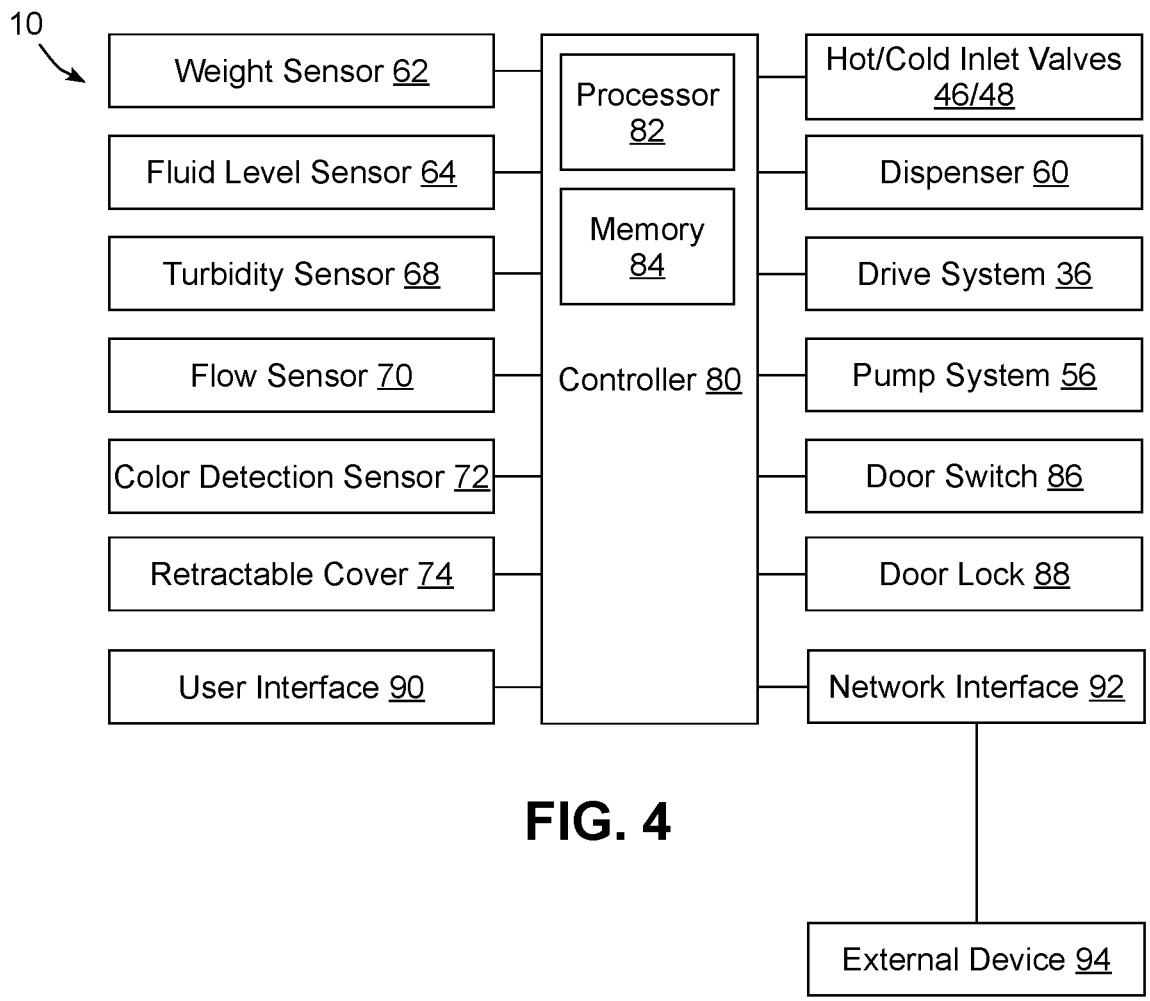
FIG. 4 is a block diagram of an example control system for the laundry washing machine of FIG. 1.

Now turning to FIG. 4, laundry washing machine 10 may be under the control of a controller 80 that receives inputs from a number of components and drives a number of components in response thereto. Controller 80 may, for example, include one or more processors 82 and a memory 84 within which may be stored program code for execution by the one or more processors. The memory may be embedded in controller 80, but may also be considered to include volatile and/or non-volatile memories, cache memories, flash memories, programmable read-only memories, read-only memories, etc., as well as memory storage physically located elsewhere from controller 80, e.g., in a mass storage device or on a remote computer interfaced with controller 80.

As shown in FIG. 4, controller 80 may be interfaced with various components, including the aforementioned drive system 36, hot/cold inlet valves 46, 48, pump system 56, weight sensor 62, fluid level sensor 64, turbidity sensor 68, flow sensor 70, color detection sensor 72 and retractable cover 74. In addition, controller 80 may be interfaced with additional components such as a door switch 86 that detects whether door 12 is in an open or closed position and a door lock 88 that selectively locks door 12 in a closed position. Moreover, controller 80 may be coupled to a user interface 90 including various input/output devices such as knobs, dials, sliders, switches, buttons, lights, textual and/or graphics displays, touch screen displays, speakers, image capture devices, microphones, etc. for receiving input from and communicating with a user. In some embodiments, controller 80 may also be coupled to one or more network interfaces 92, e.g., for interfacing with one or more external devices 94 via wired and/or wireless networks such as Ethernet, Bluetooth, NFC, cellular and other suitable networks. Additional components may also be interfaced with controller 80, as will be appreciated by those of ordinary skill having the benefit of the instant disclosure. Moreover, in some embodiments, at least a portion of controller 80 may be implemented externally from a laundry washing machine, e.g., within a mobile device, a cloud computing environment, etc., such that at least a portion of the functionality described herein is implemented within the portion of the controller that is externally implemented.

In some embodiments, controller 80 may operate under the control of an operating system and may execute or otherwise rely upon various computer software applications, components, programs, objects, modules, data structures, etc. In addition, controller 80 may also incorporate hardware logic to implement some or all of the functionality disclosed herein. Further, in some embodiments, the sequences of operations performed by controller 80 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Figure 5:
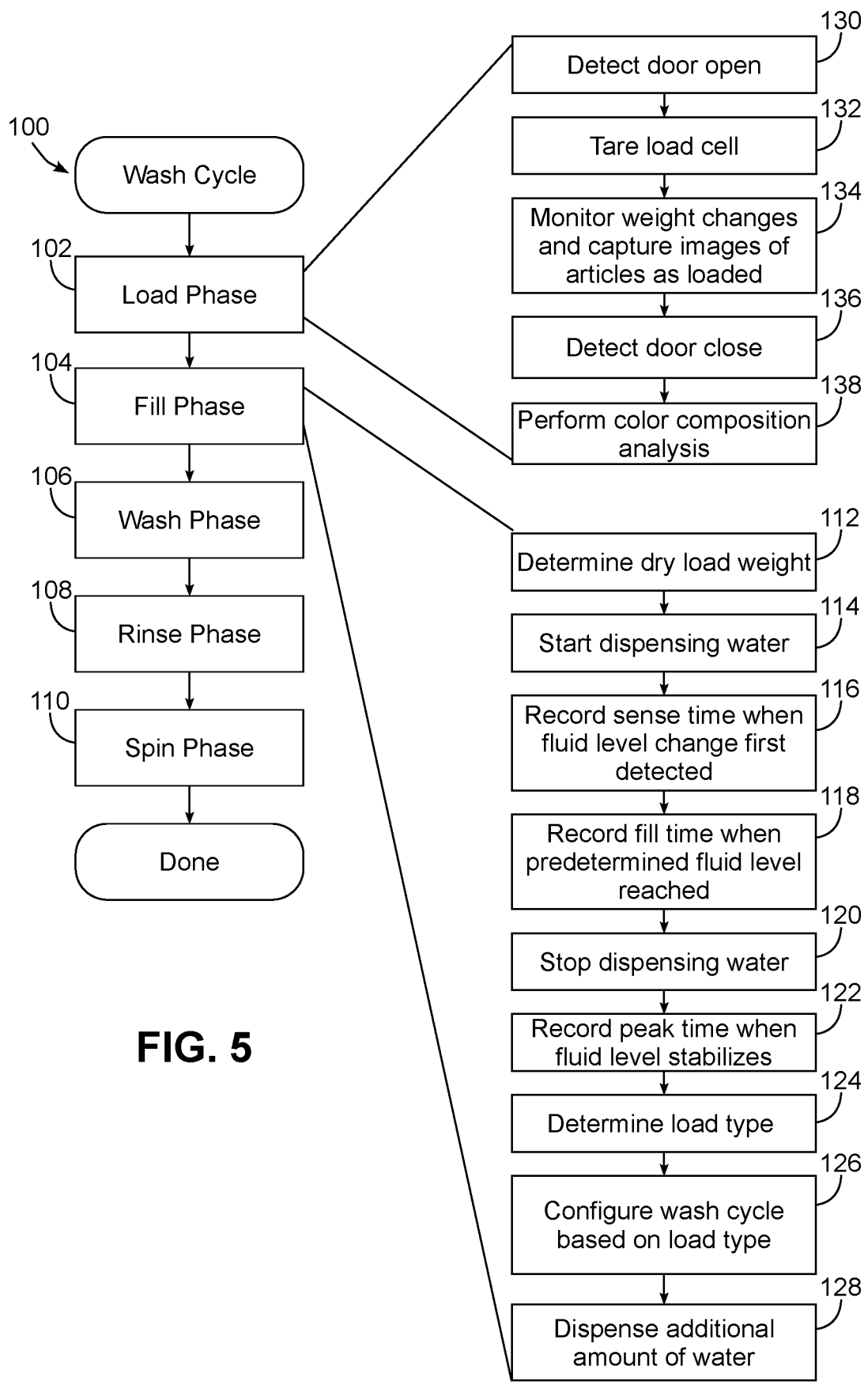
FIG. 5 is a flowchart illustrating an example sequence of operations for implementing a wash cycle in the laundry washing machine of FIG. 1.

Now turning to FIG. 5, and with continuing reference to FIGS. 3-4, a sequence of operations 100 for performing a wash cycle in laundry washing machine 10 is illustrated. A typical wash cycle includes multiple phases, including a load phase 102 where a load of articles is loaded into the wash tub, a fill phase 104 where the wash tub is initially filled with water, a wash phase 106 where the load is washed by agitating the load with a wash liquor formed from the fill water and any wash products added manually or automatically by the washing machine, a rinse phase 108 where the load is rinsed of detergent and/or other wash products (e.g., using a deep fill rinse where the wash tub is filled with fresh water and the load is agitated and/or a spray rinse where the load is sprayed with fresh water while spinning the load), and a spin phase 110 where the load is spun rapidly while water is drained from the wash tub to reduce the amount of moisture in the load.

It will be appreciated that wash cycles can also vary in a number of respects. For example, additional phases, such as a pre-soak phase, may be included in some wash cycles, and moreover, some phases may be repeated, e.g., including multiple rinse and/or spin phases. Each phase may also have a number of different operational settings that may be varied for different types of loads, e.g., different times or durations, different water temperatures, different agitation speeds or strokes, different rinse operation types, different spin speeds, different water amounts, different wash product amounts, etc.

In some embodiments consistent with the invention, a load type may be automatically and dynamically selected prior to or during the initial fill phase 104 based at least in part on multiple times determined based upon various fluid levels sensed by fluid level sensor 64 during and after the dispensation of water into the wash tub by water inlet 44, and associated with the absorbency of the articles in the load. In some embodiments, the automatic and dynamic selection may be performed in response to user selection of a particular mode (e.g., an "automatic" mode), while in other embodiments, automatic and dynamic selection may be used for all wash cycles. In still other embodiments, automatic and dynamic selection may further be based upon additional input provided by a user, e.g., soil level, article type, fabric type, article durability, etc.

In some embodiments, dynamic selection may be based at least in part on judging the absorptivity of the fabric in the load against the weight of the load. A dry weight may be determined for the load in some embodiments at the beginning of a washing cycle (e.g., at the beginning of the fill phase) using a weight sensor and prior to dispensing any water into the wash tub. Thereafter, water may dispensed into the wash tub, and fluid levels sensed by a fluid level sensor while dispensing water into the wash tub as well as after water dispensing has been paused or stopped may be used to determine multiple times that may be compared against various load type criteria to select a load type from among a plurality of different load types. The load type may then be used, for example, to determine if and how much additional water should be added for the initial fill, as well as other operational settings for the wash cycle.

As will become more apparent below, in particular, a first time at which the fluid level reaches a predetermined fluid level while dispensing water into the wash tub and a peak time at which the fluid level stabilizes after the dispensing of water into the wash tub has been stopped or paused may be used to categorize a load into one of multiple load types, as both times are affected in part by the absorbency of the articles in a load. In some instances, the first time alone may be able to categorize some loads, as, for example, the first time may be relatively short for loads containing only low absorbency fabrics such as polyesters and other synthetic materials, or may be relatively long for loads containing highly absorbent articles or fabrics such as cotton articles, bedding or towels. By incorporating the peak time into the determination, however, it has been found that additional loads may be appropriately categorized, e.g., loads where absorbency is such that the first time alone is unable to suitably categorize the load. In addition, in some embodiments, the first time may be a sense time where water is first detected by a fluid level sensor, and an additional time, e.g., a fill time at which the fluid level reaches another predetermined fluid level such as a desired minimum fill level while dispensing water into the wash tub, may also be incorporated into the determination to categorize additional loads.

In addition, as will also become more apparent below, the weight of the load may also factor into the dynamic detection of load type, e.g., by determining appropriate criteria against which the times are compared when determining whether a load is appropriately categorized into a particular load type. Further, as will also become more apparent below, in some instances it may not be necessary to wait until all of the times have been determined, as in some cases an earlier time may be used to appropriately categorize a load without waiting for determinations of later times, thereby accelerating the load type determination.

In some instances, for example, if a load type determination can be made prior to filling to a predetermined minimum level and allowing the fluid level to stabilize, it may not be necessary to stop or pause filling, and instead filling may continue uninterrupted to a dynamically calculated fluid level based on the selected load type. Doing so may therefore shorten the initial fill phase and thus the overall wash cycle duration.

In one embodiment illustrated and discussed hereinafter, for example, four different load types may be defined, a polyester load type that represents a load that is entirely or mostly comprised of polyester articles (which tend to be minimally absorbent), a cotton load type that is entirely or mostly comprised of cotton articles (which tend to be fairly absorbent), a towels load type that is entirely or mostly comprised of towels (which tend to be highly absorbent), and a mixed load type that, based upon a general absorbency, is likely comprised of some mixture of polyester and cotton articles). It will be appreciated, however, that the number and configurations of load types may vary in different embodiments, so the invention is not limited to the specific combination of load types described herein.

In addition, in this embodiment, three times may be recorded during the initial fill phase based upon fluid levels. A first time, referred to as a sense time, is a time during the initial fill phase that a fluid level change is first sensed by the fluid level sensor, i.e., a first detected change in fluid level sensed by the fluid level sensor. It will be appreciated, in particular, that when water is first dispensed into the wash tub and onto the load, the fluid level sensor will initially not detect any water at the bottom of the wash tub for some period of time, and generally not until the articles in the load have become mostly saturated with water. Thus, as the absorbency of the load increases, the sense time will generally increase as well.

A second time, referred to as a fill time, is a time during the initial fill phase that the fluid level reaches a predetermined fluid level, e.g., a minimum fluid level for the initial fill, representing the minimum amount of water that would be recommended for the load regardless of type. In some embodiments, however, a fluid level different from a minimum fluid level may be used, and further while in some embodiments the predetermined fluid level may be a constant fluid level, in other embodiments the predetermined fluid level may be varied based upon weight and/or other load characteristics (e.g., based upon user input, such as soil level, load size, etc.). As with the sense time, the fill time also generally increases with the absorbency of the load.

A third time, referred to as a peak time, is a time during the initial fill phase that the fluid level stabilizes after water dispensing has been stopped or paused. In particular, it will be appreciated that after the water inlet is shut off, the fluid level in the wash tub will generally continue to increase as water drips from the load. The peak time may be measured based upon when the fluid level stabilizes, i.e., when the fluid level stops increasing. In some embodiments, this stabilization may be based upon sensing no change in the fluid level (or alternatively, a change below a predetermined threshold) for a predetermined stabilization duration, e.g., about 15 seconds. As with the sense and fill times, the peak time also generally increases with the absorbency of the load. Furthermore, the peak time may be adjusted in some embodiments to not include the stabilization duration, i.e., such that the peak time is representative of the time at which the fluid level ceased increasing.

It will be appreciated that in other embodiments, additional times may be used, and in some embodiments, only one of the first and second times may be used. Furthermore, where the load type may be determined from the first time alone, neither of the second or third times may need to be determined, and where the load type may be determined from the first and second times, the third time may not need to be determined.

In addition, it will be appreciated that the multiple times that are determined in connection with selecting a load type are generally times relative to one or more points of reference, and thus are associated with various durations from various points of reference. In the illustrated embodiment, for example, each of the first and second times may be used to calculate durations from the beginning of water dispensing, while the third time may be used to calculate a duration from the point at which water dispensing is stopped or paused. In some instances, for example, the duration may be determined based upon the difference between the second and third times, given that in the illustrated embodiment water dispensing is stopped at the second time. The invention, however, is not limited to durations that are relative to these particular points of reference, so it will be appreciated that in other embodiments each of the times used in dynamic load type selection may be used to determine durations relative to other points of reference, and that each of the times may share a common point of reference or may be based on a completely separate point of reference in different embodiments.

Blocks 112-128 of FIG. 5, for example, illustrate an example sequence of operations capable of being performed during initial fill phase 104 in order to dynamically select a load type consistent with some embodiments of the invention. As illustrated by block 112, for example, a dry load weight may be determined using a weight sensor, and then the water inlet may be controlled to start dispensing water in block 114. Thereafter, when a change in the fluid level is first sensed by the fluid level sensor, the time at which this occurs may be recorded as the sense time in block 116. Furthermore, when a predetermined fluid level (e.g., a minimum fill level) is sensed by the fluid level sensor, the time at which this occurs may be recorded as the fill time in block 118.

In addition, when the predetermined fluid level is reached, the water inlet is controlled to stop dispensing water in block 120, and when the fluid level is determined to be stabilized (e.g., when the fluid level remains substantially constant for at least 15 seconds), the time at which this occurs (or alternatively the beginning time at which the fluid level stopped increasing) may be recorded as the peak time in block 122.

Next, in block 124, the load type is determined based upon the first, second and third times and the dry load weight (in a manner discussed in further detail below), and in block 126, the wash cycle is configured, e.g., based at least in part upon the determined load type. For example, each load type may be associated with a set of operational settings stored in controller 80 such that selection of a particular load type causes controller 80 to access the set of operational settings for the selected load type when completing the remainder of the wash cycle. In addition, as will become more apparent below, in some embodiments color composition data, collected by a color detection sensor, may also be used in lieu of or in combination with the first, second and third times and the dry load weight to determine the load type in block 124 and/or otherwise configure the wash cycle in block 126.

Next, block 128 optionally dispenses an additional amount of water to complete the fill phase. For example, the additional amount of water may be selected to provide a total amount of dispensed water selected based upon load type or selected via a separate load size selection by the user. In other embodiments, the amount of water dispensed in blocks 114-120 may be the total amount of water dispensed during the fill phase, and block 128 may be omitted. Nonetheless, in some embodiments, even when no additional water is dispensed after selecting load type, the load type may be selected prior to transitioning to the wash phase, and in some instances prior to any agitation of the load and/or draining of fluid from the wash tub. Furthermore, it will be appreciated that the amount of time expended selecting the load type may be minimal or even imperceptible in some embodiments.

As noted above, in some embodiments, color composition analysis may also be performed on the articles in a load in order to determine the load type in block 124 or configure one or more operational settings for a wash cycle in block 126. Blocks 130-138, for example, illustrate one example sequence of operations capable of being performed during a load phase 102 of the wash cycle in order to collect and analyze color composition data associated with a load. In the illustrated embodiment, this data collection may be performed during a load phase of the wash cycle, which generally refers to the portion of a wash cycle during which articles are loaded into the machine. It will be appreciated that this load phase may not be considered to be part of the wash cycle itself in some embodiments, since in some embodiments the user will load the articles prior to invoking any explicit command to start a wash cycle or even explicitly power on the laundry washing machine. In some instances, for example, a door switch may be used to automatically activate and/or deactivate color composition collection in some embodiments, even where the user has not explicitly selected a user control to power on or start a wash cycle. Generally, however, color composition data collection will be performed in the illustrated embodiments at some point during an initial loading of articles into the laundry washing machine, and generally prior to filling the wash tub with water.

In the embodiment illustrated in FIG. 5, for example, load phase 102 begins in block 130 when opening of door 12 is detected (e.g., via door switch 86 of FIG. 4), and in block 132, the load cell 62 is tared to generate a baseline load cell reading for the empty wash tub. Next, in block 134, weight changes detected by the load cell are monitored and used to trigger the capture of images by color detection sensor 72 (e.g., a camera), thereby collecting images as articles are loaded into the wash tub. Then, in block 136, closing of door 12 is detected, thereby signifying that the load has been loaded into the laundry washing machine. Block 138 then performs color composition analysis on the collected images, e.g., to categorize the load into one of a plurality of color categories, e.g., whites, lights, darks, reds, mixed or some other collection of visually-distinguishable categories. The result of the color composition analysis may then be used in the determination of load type in block 124 and/or in the configuration of the wash cycle in block 126.

As noted above, absorption characteristics and color characteristics of a load may be used together to configure a wash cycle in some embodiments, while in other embodiments, only one of absorption characteristics and color characteristics may be used. Further details regarding the determination of each of the different types of characteristics are provided in greater detail below.

Load Type Selection Based on Absorption Characteristics During Initial Fill

As noted above, in order to select from the aforementioned load types in the illustrated embodiments, a number of load type criteria may be defined. Furthermore, in the illustrated embodiment, at least some of these various load type criteria may be load weight dependent, such that the criteria vary with load weight.

It may be desirable, for example, to utilize linear equations of the form y=mx+b, where y is a threshold time or duration, x is the load weight, m is the rate at which the threshold time or duration increases as weight increases, and b is the y-intercept that best represents the data at realistic load sizes. In some embodiments, the linear equations may be empirically determined, and in some embodiments, other equations, e.g., polynomial or non-linear equations, may be used to represent the load type criteria. In other embodiments, load type criteria may be based on fuzzy logic or neural network-derived thresholds. Other manners of mapping the determined times to different load types will be appreciated by those of ordinary skill having the benefit of the instant disclosure.

In the illustrated embodiment, for example, six different load criteria may be used to map the aforementioned sense, fill and peak times to the polyester, mixed, cotton and towel load types. In this embodiment, the criteria associated with the sense and fill times are based upon a duration from the start of dispensing water to the respective sense and fill times, and all are based on linear equations that are function of the dry weight of the load. An additional criterion associated with the peak time, however, is based on a duration from the end of dispensing water (or alternatively, the fill time) to the peak time, and is not a function of the dry weight of the load, but is instead a constant threshold.

A first load criterion that may be used is a polyester sense criterion that may be used to determine when the sense time indicates that the load type is a polyester load type. In some embodiments, this criterion defines a weight-varying threshold that is met when the sense time or duration is below the threshold.

A second load criterion that may be used is a towels sense criterion that may be used to determine when the sense time indicates that the load type is a towels load type. In some embodiments, this criterion defines a weight-varying threshold that is met when the sense time or duration is above the threshold.

A third load criterion that may be used is a cotton sense criterion that may be used to determine when the sense time indicates that the load type is a cotton load type. In some embodiments, this criterion defines a weight-varying threshold that is met when the sense time or duration is above the threshold, but still below the weight-varying threshold for the towels sense criterion.

A fourth load criterion that may be used is a cotton peak criterion that may be used to determine when the peak time indicates that the load type is a cotton load type. In some embodiments, this criterion defines a weight-independent threshold that is met when the peak time or duration is above the threshold, even when the cotton sense and towels sense criteria are not met by the sense time or duration.

A fifth load criterion that may be used is a polyester fill criterion that may be used to determine when the fill time indicates that the load type is a polyester load type. In some embodiments, this criterion defines a weight-varying threshold that is met when the fill time or duration is below the threshold, even when the polyester sense criterion is not met by the sense time or duration.

Further, in some embodiments, a sixth load criterion may be used, and may be referred to as a mixed sense criterion that is used to determine whether to evaluate the cotton peak criterion or the polyester fill criterion based upon whether the sense time is more indicative of a cotton load type than a polyester load type. In some embodiments, this criterion defines a weight-varying threshold that, when the sense time or duration is above the threshold, indicates that the peak time should be evaluated against the cotton peak criterion to select between the cotton and mixed load types. In contrast, when the sense time or duration is below the threshold, the criterion indicates that the fill time should be evaluated against the polyester fill criterion to select between the polyester and mixed load types. If none of the first five load criteria is met, then the load is determined to be a mixed load type.

It will be appreciated that the various criteria discussed herein may be determined empirically in some embodiments, and may be specific to a particular laundry washing machine design. In addition, in some embodiments, additional factors may be considered in such criteria, e.g., water inlet flow rate, water temperature, etc.

Figure 6:
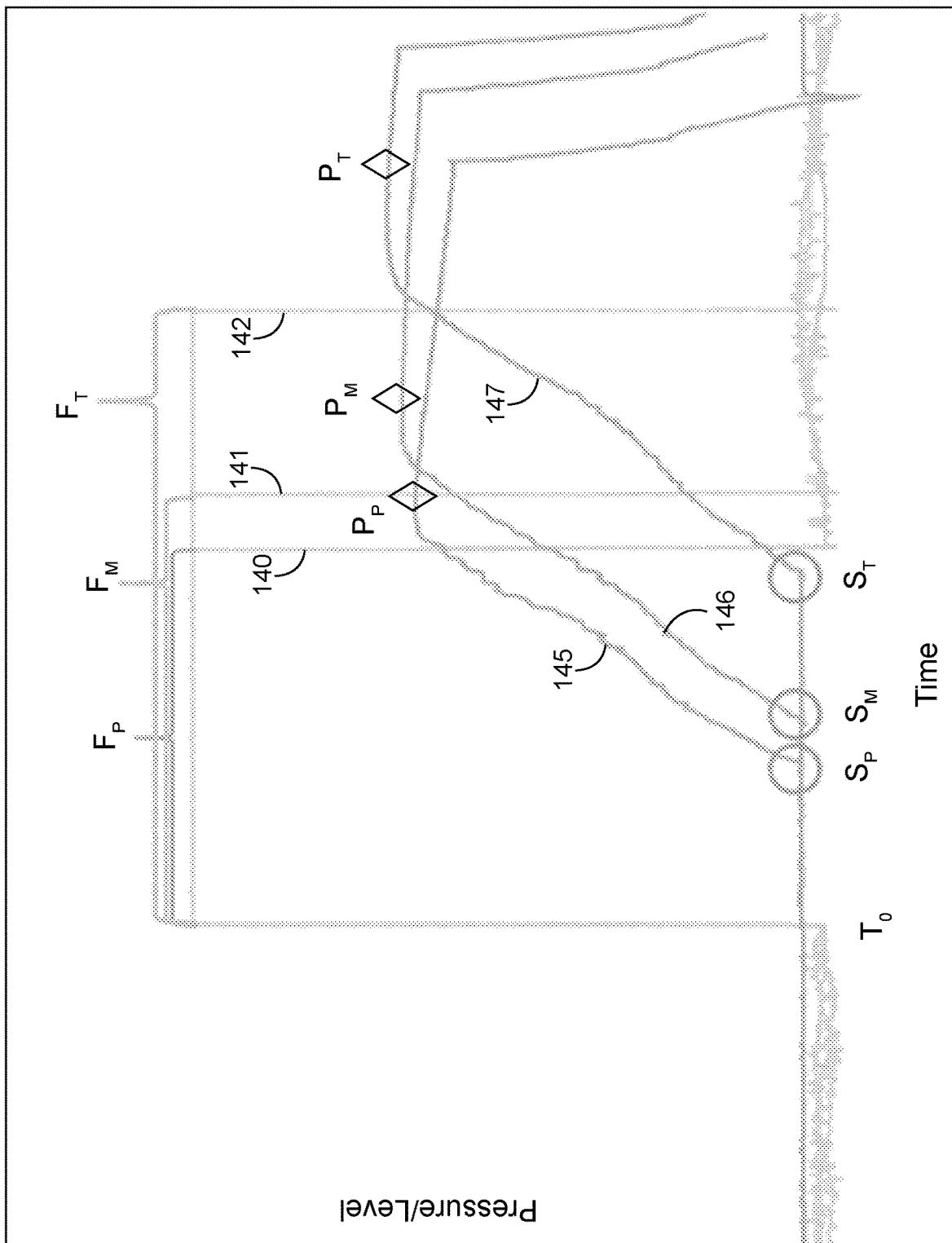
FIG. 6 is a graph illustrating plots of fluid levels over time for example polyester, towels and mixed loads.

FIG. 6, for example, illustrates fluid level plots for three different representative loads during an initial fill operation, the first having a polyester load type and represented using the subscript "P", the second having a mixed load type and represented using the subscript "M", and the third having a towels load type and represented using the subscript "T". Plots 140, 141 and 142 respectively represent the duration of the initial minimum fill, with each starting to fill the wash tub at time $T_0$, and plots 145, 146, and 147 respectively represent the fluid levels sensed by the fluid level sensor for each of the polyester, mixed and towels loads. Times $S_P$, $S_M$ and $S_T$ (represented by the circles) respectively represent the sense times for the three loads, where the fluid level initially begins to rise. Times $F_P$, $F_M$ and $F_T$ (represented by the brackets) respectively represent the fill times for the three loads, where the predetermined fluid level is reached. Times $P_P$, $P_M$ and $P_T$ (represented by the diamonds) respectively represent the peak times for the three loads, where the fluid level stabilizes after the completion of the initial fill. It will be appreciated that since the towels load is generally more absorbent than the mixed load, and the mixed load is generally more absorbent than the polyester load, the various sense, fill and peak times for the three loads reflect these absorbency differences.

Figure 7:
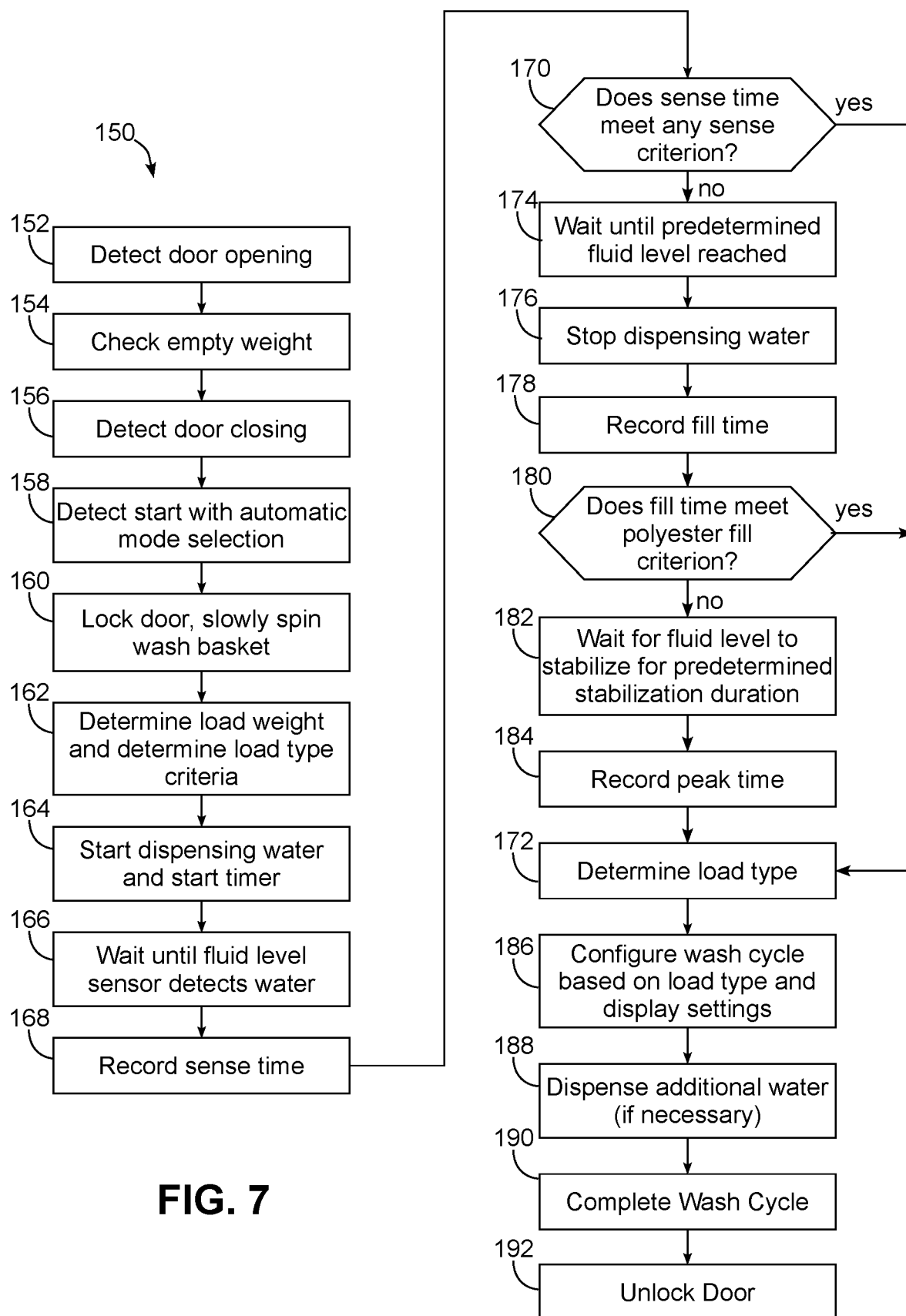
FIG. 7 is a flowchart illustrating another example sequence of operations for implementing a wash cycle in the laundry washing machine of FIG. 1.

Now turning to FIG. 7, this figure illustrates another sequence of operations 150 that may be used to implement a wash cycle with absorbency-based dynamic load type selection consistent with the invention. Block 152 initially detects opening of the washing machine door, e.g., using door switch 86, and upon opening, block 154 determines a tare weight assuming wash tub 16 is empty using weight sensor 62.

Block 156 then detects the door closing using door switch 86. Block 156 may also check the output of weight sensor 62 to determine that a load has been placed in the wash tub. Block 158 then detects a selection by the user of an "automatic" mode along with a request to start the wash cycle, and then passes control to block 160 to initiate actuation of door lock 88 to lock the door. A safety algorithm may also be performed at this time to determine whether the machine is able to proceed with a wash cycle. At this time, the controller may also begin to slowly spin the wash basket, particularly in the event that the weight sensor 62 is implemented using an offset sensor that is sensitive to the distribution of a load in the wash tub (e.g., a single load cell disposed proximate a corner of the housing).

Next, block 162 determines the load weight using weight sensor 62 and the tare weight determined in block 154, e.g., by averaging multiple weight sensor readings captured over the course of several revolutions of the wash basket and then computing a difference between this loaded weight and the tare weight determined in block 154. At this time, it may also be desirable to use the load weight to calculate the various weight-varying load type criteria thresholds discussed above.

Next, in block 164, water inlet 44 is controlled to start dispensing water into the wash tub. It is generally desirable to distribute the water evenly across the load, e.g., using multiple and/or oscillating nozzles, and in some instances it may be desirable to continue spinning the wash basket at a slow speed to further distribute the water more evenly. In addition, a time may be started at this time to provide a consistent point of reference for the time determinations.

As noted above, right after the water is turned on, pressure sensor 64 will not detect any water at the bottom of the basket because of the fabric's absorptivity. Different fabrics have different absorptivity levels (generally, from lowest to highest: delicates, polyester, mixed, cotton, towels). The fabric type and amount of fabric (e.g., as represented by weight) will both affect how much water is absorbed and how long it takes for water to reach the bottom of the basket. Thus, once the pressure sensor detects a very small amount of water at the bottom of the basket representing a first detected change in fluid level sensed by the fluid level sensor (block 166), the elapsed time between this moment and the water inlet being opened to start dispensing water is recorded as the sense time (block 168).

As noted above, in the illustrated embodiment, there are several cases where the sense time alone may be enough to determine the load type. In particular, there are three cases, based on the polyester sense criterion, the cotton sense criterion and the towels sense criterion, where sense time is enough to decide the load type, and if any are met, then the rest of the sensing phase may be skipped and the load type may be selected prior to reaching and recording the later times. In some instances, the time savings may be several minutes or more, particularly in the instance where a load contains only low absorbency fabrics and water begins dropping to the bottom of the wash tub very soon after water dispensing starts. Thus, block 170 may determine if any of the aforementioned criteria are met, and if so, pass control to block 172 to determine the load type based upon the sense time.

If not, however, block 170 passes control to block 174 to continue filling the wash tub and wait until a predetermined fluid level, e.g., a minimum fill fluid level, is reached. Once this fluid level is reached, the water inlet is turned off (block 176) and the time elapsed between this point and the water turning on is recorded as the fill time (block 178). In the illustrated embodiment, filling to the minimal water level may be used to differentiate between polyester and mixed or mixed and cotton loads; however, fill time itself may be used to tell the difference between polyester and mixed loads if the sense time alone is insufficient to distinguish between the two. Thus, block 180 may determine if the fill time meets the polyester fill criterion, and if so, passes control to block 172 and skip the remainder of the sensing phase.

If, however, the criterion is not met, block 180 passes control to block 182 to wait for the fluid level to stabilize for a predetermined stabilization duration (e.g., about 15 seconds in some embodiments). As noted above, once the water inlet is stopped, the water level will continue to increase as water drips from the load. These small water level changes may be sensed by the pressure sensor, and once the water level has stagnated or stabilized for the desired duration, the time elapsed between the water being shut off and the last increase in pressure sensor readings may be recorded as the peak time in block 184.

Next, control passes to block 172 to determine the load type based on the three recorded times. Then, in block 186, the controller may configure the wash cycle based on the load type, and may optionally display these settings to a user on a display of the machine. Block 188 optionally dispenses an additional amount of water to complete the fill phase (e.g., if based upon the weight and/or load type it is determined that a larger volume of water is required). The wash cycle is then completed in block 190 using the operational settings associated with the selected load type, and upon completion of the wash cycle, the door is unlocked in block 192 by deactivating door lock 88.

Figure 8:
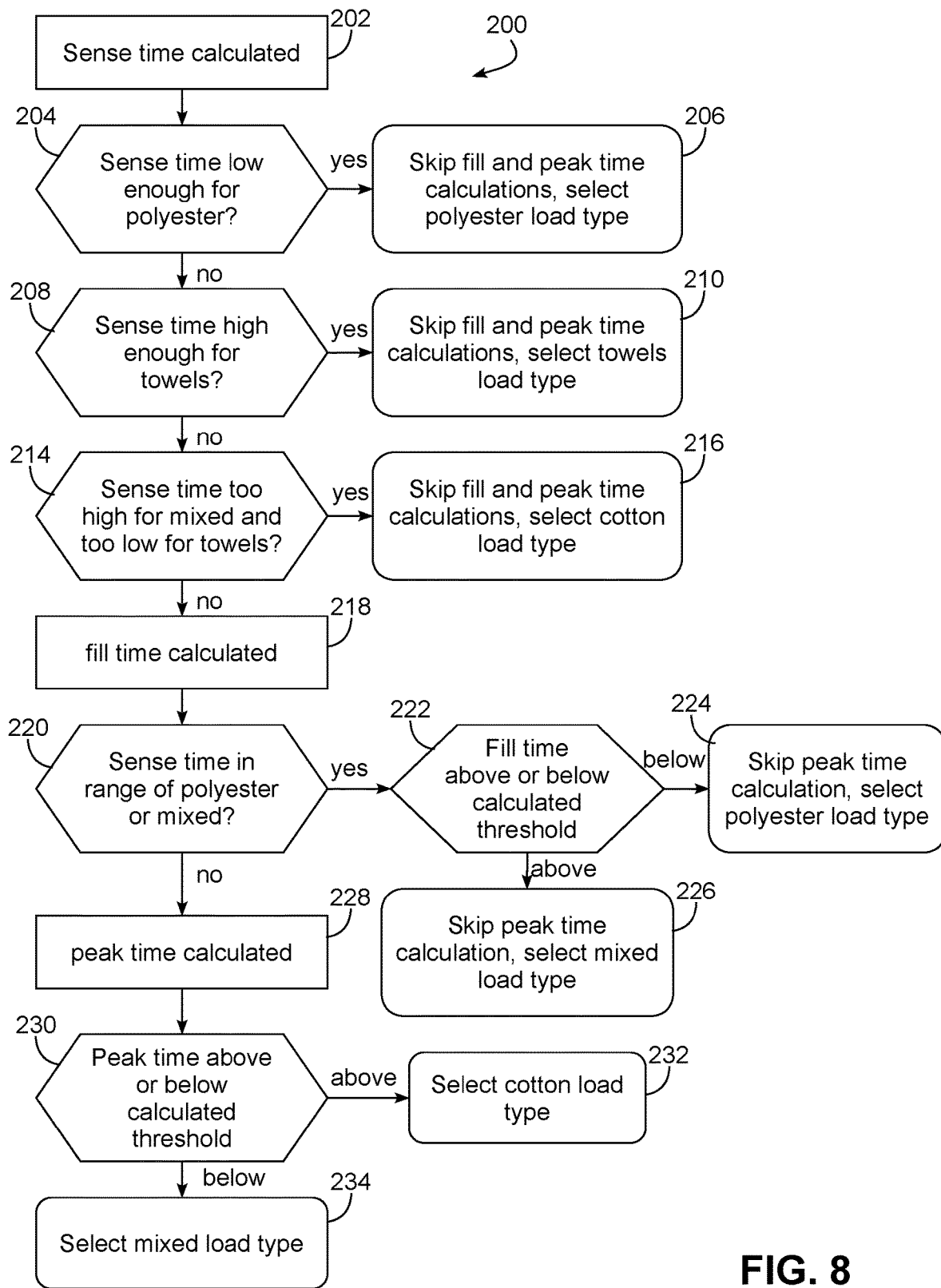
FIG. 8 is a flowchart illustrating an example sequence of operations for performing the load type determination referenced in FIG. 7.

While it will be appreciated that dynamic load type selection based upon the aforementioned times may be implemented in a number of other manners, one example implementation of a load type selection operation such as is performed in block 172 is illustrated by sequence of operations 200 in FIG. 8. In general, in the illustrated embodiment, the load weight and the sense time may be used to categorize a load into one of five categories:

1) Known to be polyester from sense time
2) Cannot tell between polyester and mixed, needs fill time to decide
3) Cannot tell between mixed and cotton, needs peak time to decide
4) Known to be cotton from sense time.
5) Known to be towels from sense time.

Thus, sequence 200 may be used to use the sense time, and if necessary, either of the fill and peak times, in order to determine the load type. Furthermore, sequence 200 may, in some instances, select a load type prior to reaching the fill and/or peak times, thereby dynamically shortening a sensing phase during which the load type is determined.

As shown in block 202, sequence 200 may begin by calculating the sense time, and then determining in block 204 (e.g., using the polyester sense criterion) whether the sense time is low enough for the polyester load type. If so, control passes to block 206 to skip the fill and peak time calculations and select the polyester load type.

Otherwise, block 204 passes control to block 208 to determine (e.g., using the towels sense criterion) whether the sense time is high enough for the towels load type. If so, control passes to block 210 to skip the fill and peak time calculations and select the towels load type.

Otherwise, block 208 passes control to block 214 to determine (e.g., using the cotton sense criterion) whether the sense time is high enough for the cotton load type, or more specifically, if the sense time is too high for the mixed load type but too low for the towels load type. If so, control passes to block 216 to skip the fill and peak time calculations and select the cotton load type.

Otherwise, block 214 passes control to block 218 to calculate the fill time, and block 220 determines (e.g., using the mixed sense criterion) whether to evaluate the cotton peak criterion or the polyester fill criterion based upon whether the sense time is more indicative of a cotton load type than a polyester load type. Specifically, if block 220 determines that the sense time is in range of a polyester or mixed load type, control passes to block 222 to determine (e.g., using the polyester fill criterion) whether the fill time is above or below the calculated threshold associated with the criterion. If below, control passes to block 224 to skip the peak time calculation and select the polyester load type, and if above, control passes to block 226 to skip the peak time calculation and select the mixed load type.

Returning to block 220, if it is determined that the sense time is not in range of a polyester or mixed load type, control passes to block 228 to calculate the peak time, and then to block 230 to determine (e.g., using the peak cotton criterion) whether the peak time is above or below the calculated threshold associated with the criterion. If above, control passes to block 232 to select the cotton load type, and if below, control passes to block 234 to select the mixed load type.

It will be appreciated that sequences 150 and 200 are merely illustrative in nature, and that other sequences may be used in other embodiments. Further, different numbers of load types and criteria used to distinguish between load types may be used in other embodiments.

Load Type Selection Based on Color Composition Analysis During Loading

As noted above, in addition to or in lieu of load type selection based upon absorption characteristics of a load, the color composition of a load may be used. In some embodiments consistent with the invention, for example, the colors of the articles in a load may be detected and used to characterize the load, e.g., to categorized the load into one of a plurality of different color-based load types. The color-based load types, for example, may include load types such as whites, lights, darks, reds, etc. The load types may, in some embodiments, include solid color load types that are associated with specific colors or ranges of colors, e.g., whites, lights, darks, reds, and in some embodiments, the load types may include mixed color load types that are associated with mixtures of two or more solid color load types, e.g., mixed lights and whites, mixed lights and darks, mixed darks and reds, etc. Then, based upon the selected color-based load type, whether considered alone or in combination with an absorption-based load type, one or more operational settings may be set for a wash cycle performed by a laundry washing machine, which can, in many instances, improve the lifetime of articles, whose lifetimes are often shortened due to non-ideal washing environments.

In some embodiments, and as will be discussed in greater detail below, it may be desirable to utilize a color detection sensor in combination with a weight sensor, and optionally a door switch, to perform a plurality of color composition data captures with the color detection sensor responsive to detected weight changes sensed by the weight sensor as a load of articles is added to a wash tub. Color composition data captures, e.g., in the form of digital images comprising arrays of pixel data, may be triggered, for example, in response to the weight sensor detecting a stable weight in the wash tub for at least a predetermined duration. The detection of a stable weight for at least a predetermined duration may be associated with, for example, the addition of a new article (or articles) to the wash tub, thereby enabling a new image to be captured for each article, or set of articles, added to the wash tub. As such, the amount of weight change, as well as the predetermined duration, may be empirically determined in some embodiments to optimize the capture of color composition data based upon how users generally add articles to a wash tub.

Moreover, the determination of a stable weight may vary in different embodiments. For example, in some embodiments, a stable weight may be based on an amount of weight change over the predetermined duration that varies by less than a threshold amount or percentage. In some embodiments, a stable weight may be based on a variation of less than about 0.5 pounds over about a 2 second duration, although it will be appreciated that the invention is not limited to these particular values, as other values may be better suited for other laundry washing machine designs or even different users.

In addition, in some embodiments, it may be desirable to utilize a color decision algorithm to characterize captured color composition data in association with characterizing a load of articles. A color decision algorithm, in this regard, may be considered to include a computer-implemented algorithm capable of processing color composition data collected from a load in order to characterize the color or colors of the articles in the load. A color decision algorithm in some embodiments may be performed or executed entirely within a laundry washing machine, e.g., by the controller thereof, or may be performed or executed entirely within a device that is remove from the laundry washing machine, e.g., on a cloud computing device, a mobile device, a server, or practically any type of computing device that may be in communication with the laundry washing machine, whereby the laundry washing machine may initiate the color decisional algorithm by communicating captured color composition data to a remote device and receiving result data from the remote device containing intermediate or final results associated with the color decision algorithm. In still other embodiments, different portions of a color decision algorithm may be performed or executed by a laundry washing machine in combination with one or more remote devices, with various input and/or result data communicated therebetween.

A color decision algorithm in some embodiments may operate at least in part by assigning color categories to pixels in captured color composition data. For example, where captured color composition data takes the form of a series of captured images, color categories may be assigned to all or at least a subset of the pixels in each captured image, and a color decision algorithm may characterize a load in part by counting the number of pixels assigned to each color category. It may be desirable in some embodiments to exclude pixels associated with certain regions of an image, e.g., if certain regions of the field of view of a color detection sensor do not depict the load itself, e.g., if certain regions represent the structure of the laundry washing machine itself. In some embodiments, for example, pixels that are determined to correspond to the wash tub itself may be excluded, or may be assigned to a "wash tub" category. Determination of whether pixels correspond to the wash tub may be based, for example, on a known color of the wash tub, or, for example, by comparison of an image with a captured image of an empty wash tub.

It will also be appreciated that the pixels to which color categories are assigned may, but are not required to, correspond to the pixels in each capture of color composition data. In other embodiments, however, the sizes (i.e., the regions within the field of view of the color detection sensor to which each pixel corresponds) may vary between the raw data captured by the color detection sensor and the color composition data that is analyzed by a color decision algorithm. As an example, the pixels used for color categories may represent groups of pixels in captured images in some embodiments, e.g., as a result of downsampling of the captured images to reduce the volume of color composition data processed by the color decision algorithm.

In addition, in some embodiments, once color categories are assigned to pixels from the color composition data, the counts of the pixels in each category may be used to characterize the overall load, e.g., to assign a color category to the load itself, such as whites, lights, darks, reds, or mixes thereof. In other embodiments, however, a color category need not be assigned to the load itself, and the color categories of the color composition data may be analyzed separate of any overall load characterization in order to control one or more operational settings for a wash cycle.

As will also become more apparent below, a color decision algorithm may also be used to detect outlier articles in a load, and to optionally generate an alert to a user and/or change one or more operational settings for a wash cycle based upon detection of outlier articles. An outlier article, in this regard, may be considered to be an article that substantially differs in color composition from other articles in a load, e.g., a white article in a load that is predominantly full of dark and/or red articles, or vice versa. It will be appreciated that the presence of an outlier article in a load may increase the likelihood of bleeding between articles during washing, e.g., if a single red or dark article (or a few of such articles) is included in a load of whites, or if a single white article (or a few of such articles) is included in a load of darks or reds.

In some embodiments, the detection of an outlier article may be used to generate an alert in response to detection of one or more outlier articles from the load of articles added to the wash tub in the categorized color composition data. An alert, for example, may be implemented using an audible and/or visual indication to the user, such as a light indicator on a user interface of the laundry washing machine, a pop-up window on an LCD screen, an audible warning such as a buzzer or beep, and/or an alert generated on a connected mobile device (e.g., a text message, a notification, etc.), and in some instances, the alert may be combined with a mandated pause in the wash cycle to give the user the opportunity to remove any outlier articles. In some embodiments, for example, a user may be given an opportunity to remove any outlier articles and thereafter may be required to confirm that the articles have been removed before the wash cycle may proceed.

Further, in some embodiments, instead of or in addition to the generation of an alert, one or more operational settings for a wash cycle may be modified in part based on the detected presence of one or more outlier articles. For example, in some embodiments, the detected presence of an outlier article may cause a color decision algorithm to select a different color load type for a load than would have been selected were the outlier article not detected, e.g., by changing a solid color load type to a mixed color load type.

A color decision algorithm may also be based in part on some calibration performed during installation and/or during each wash cycle. For example, in some embodiments, ambient room lighting conditions may be assessed just after a color detection sensor has been activated, e.g., to compare images from a calibration process (e.g., the calibration process discussed in greater detail below) with one or more current images in order to process the images by providing R, B and/or G gains or subtractions to the image/video data captured by a color decision algorithm. In addition, it will be appreciated that various image processing techniques may be used in connection with a color decision algorithm, e.g., to crop or smooth an image, etc.

Figure 9A:
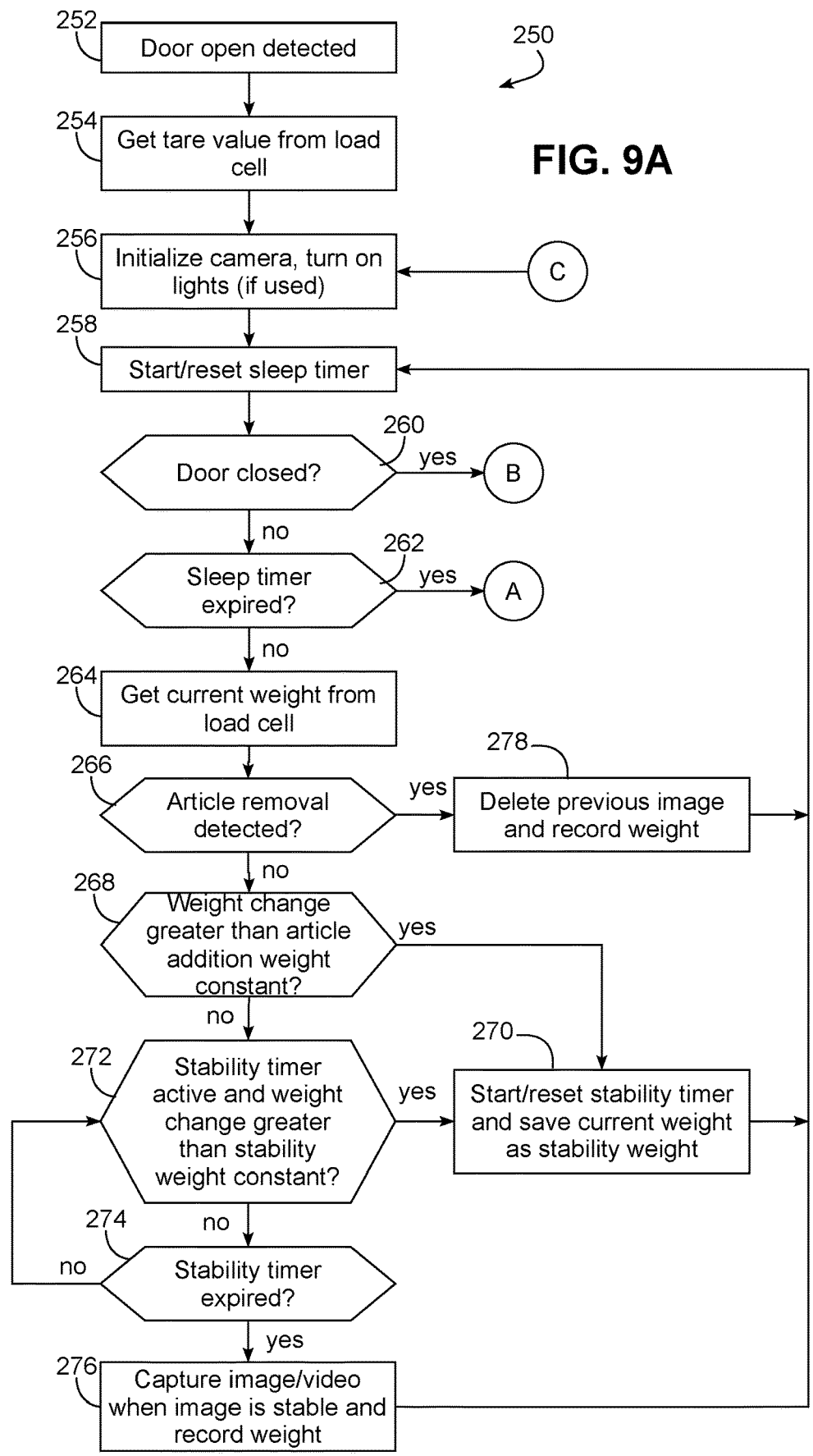
FIGS. 9A-9C illustrate a flowchart for an example sequence of operations for capturing and analyzing images of a load in the laundry washing machine of FIG. 1.
Figure 9B:
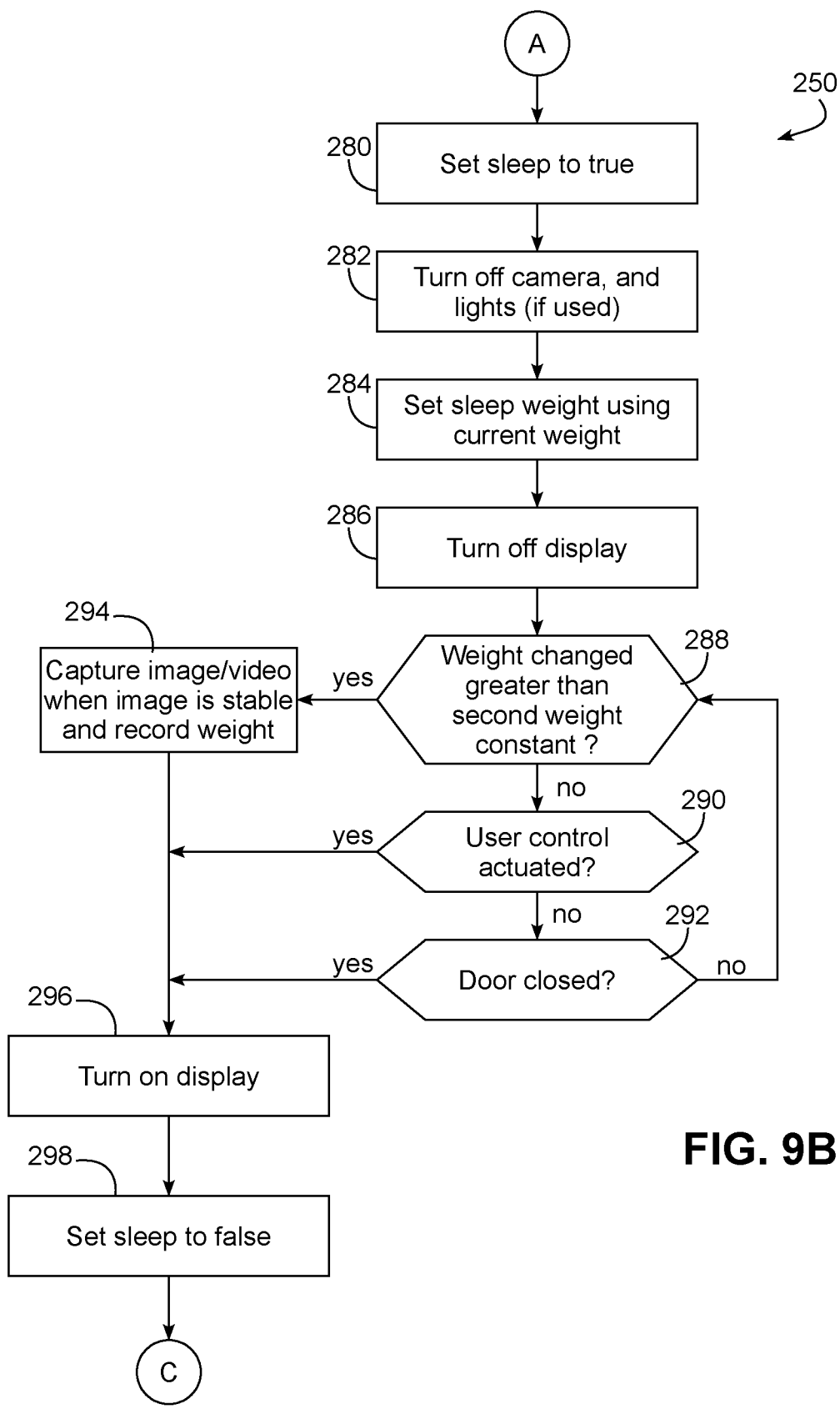
Figure 9C:
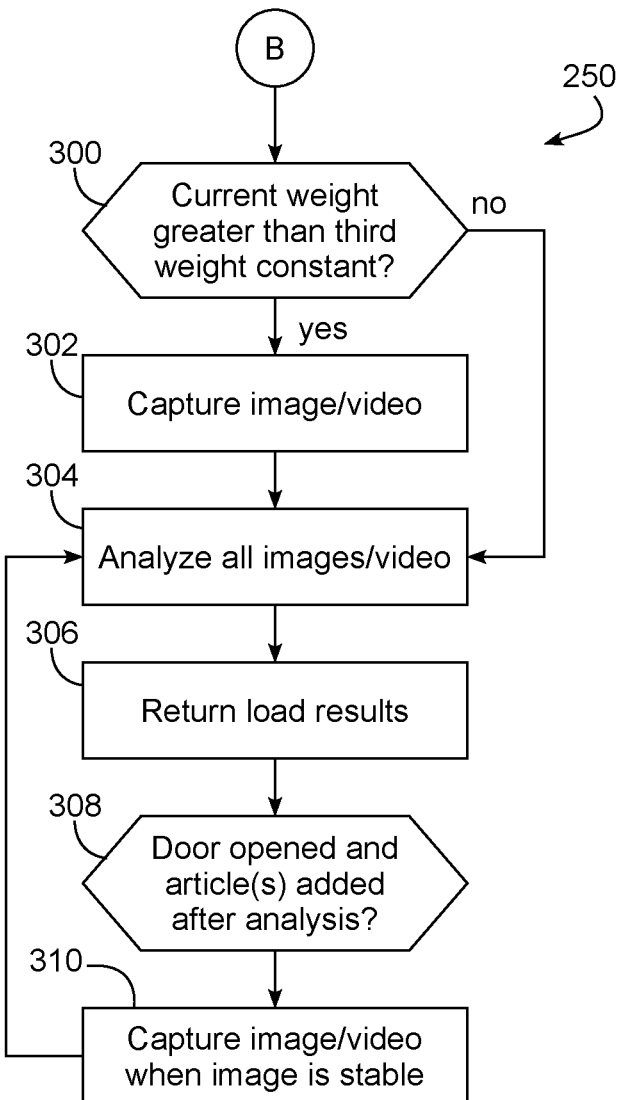

Now turning to FIGS. 9A-9C, these figures illustrate an example sequence of operations 250 for capturing and analyzing color composition data for a load in a manner consistent with some embodiments of the invention. Sequence 250 utilizes as a color detection sensor a digital camera, as well as a door switch and a weight sensor such as a load cell, to capture digital images of articles of a load as they are loaded into a laundry washing machine. Sequence 250 is initiated in block 252 upon detection of the door being opened by the door switch, and block 254 captures a weight reading from the load cell to obtain a tare value corresponding to the weight of the empty wash tub. Next, in block 256, the camera is initialized, and if one or more lights are used to illuminate the wash tub and assist with capturing images, those lights may be turned on at this time.

Next, in block 258, a sleep timer, which may be used to place the laundry washing machine in a low power mode in the absence of activity for a predetermined period of time, is started, and block 260 determines whether the door has been closed. If not, block 262 determines whether the sleep timer has expired.

If the sleep timer has not yet expired, control passes to block 264 to capture a current weight value from the load cell, and block 266 determines whether any article removal has been detected, e.g., if the weight change is a negative value from the previously captured weight value. If not, control passes to block 268 to determine if a weight change from the previously captured weight value is greater than a first, article addition weight constant. The article addition weight constant may be selected, for example, based upon a value that is indicative of the weight of one or more articles typically added to a wash tub, with the understanding that a lower constant will generally result in the capture of more images representing different layers of the load during the loading phase, while a higher constant will result in the capture of fewer images representing different layers of the load during the loading phase.

If the change in weight is greater than the article addition weight constant, control passes to block 270 to start a stability timer and save the current weight as a stability weight, and then return control to block 258 to reset the sleep timer and continue monitoring the weight. As noted above, in the illustrated embodiment images are generally captured after the weight in the wash tub has remained generally stable for a predetermined duration (e.g., about 2 seconds in the illustrated embodiment), as such, the stability timer is started to wait for the predetermined duration and trigger an image capture if the weight remains stable over this duration. The determination of whether the weight has remained stable may be made based upon comparison of the current weight against a relatively smaller constant referred to herein as a stability weight constant (e.g., about 0.5 pounds in the illustrated embodiment). As such, block 272, which is executed if block 268 determines that the weight change is less than the article addition weight constant, is used to compare the weight change against this stability weight constant whenever the stability timer is running, and passes control to block 270 in the event that the weight change during this duration exceeds the stability weight constant. Doing so resets the stability timer and saves the current weight as the new stability weight.

If the stability weight constant has not been exceeded in block 272, control passes to block 274 to determine if the stability timer has expired. If not, control returns to block 272 to continue to wait for the stability timer to expire. If the stability timer has expired, however, block 274 passes control to block 276 to capture color composition data (e.g., an image, a series of images, or a video) and record the current weight, which is then used as the baseline weight against which the article addition weight constant is subsequently measured. The capture of color composition data may also, in some instances, be accompanied by a determination of when the data has become stable, e.g., when a series of images or frames of video depict substantially the same image. In some embodiments, for example, when it is desirable to capture color composition data, a sequence of images or frames of a video stream may be captured and compared with one another until image stability is reached, e.g., where no movement of additional clothing being added to the wash tub or a user's arm is detected. When image stability is achieved, it may be used as a precursor to stop the stream of image captures or video, record a stable capture, and weigh the load and wait on a further change in state, e.g., someone putting more clothes in the basket, closing the door, touching the user interface, etc.

After capturing color composition data in block 276, control returns to block 258 to reset the sleep timer and continue monitoring the weight. Returning to block 266, if article removal is detected, e.g., as a result of a negative weight change being detected, control passes to block 278 to delete the previously-stored image, and record the weight, and then return control to block 258.

Now returning to block 262, and with further reference to FIG. 9B, in the event that the sleep timer expires, control passes to block 280 set a sleep state to TRUE, and then to block 282 to turn off the camera and any lights. Block 284 then sets a sleep weight using the current weight, and block 286 turns off the display of the laundry washing machine, whereby the laundry washing machine is in a sleep state.

Blocks 288, 290 and 292 test for various conditions that can awaken the laundry washing machine from the sleep state. Block 288 tests for a weight change that is greater than a second weight constant, while blocks 290 and 292 test for whether a user control has been actuated (e.g., for a touch screen embodiment, whether the screen has been touched by the user) or whether the door has been closed by the user (sensed by the door switch). If block 288 detects a sufficient weight change relative to the second weight constant (which may be equal to either the stability weight constant or the article addition weight constant, or another constant altogether), control passes to block 294 to capture color composition data from the wash tub (e.g., one or more images and/or a video) and record the weight, and generally with the color composition capture occurring once image stability has been detected. Control then passes to block 296 to turn on the display and to block 298 to set the sleep state to FALSE, and control then returns to block 256 of FIG. 9A. If blocks 290 and 292 detect either actuation of a user control or closing of the door, block 294 is bypassed, and control passes directly to blocks 296 and 298 to turn on the display, set the sleep state to FALSE and awaken the laundry washing machine, and then return control to block 256 of FIG. 9A.

Returning to block 260 of FIG. 9A, and with further reference to FIG. 9C, if closing of the door is detected with the door switch, control passes to block 300 of FIG. 9C to determine if the current weight is greater than a third weight constant (which may be the same or different from any of the aforementioned constants), and if so, passes control to block 302 to capture color composition data from the wash tub (e.g., one or more images and/or a video), and generally with the color composition capture occurring once image stability has been detected. If the current weight does not exceed the third weight constant, block 300 bypasses block 302 and no additional color composition data is captured.

In either event, block 304 next analyzes all of the captured color composition data (e.g., images and/or video) using a color decision algorithm, which may be performed locally in the laundry washing machine controller, remotely in a remote device, or using a combination thereof. The results of the algorithm are then returned in block 306. In addition, as illustrated in block 308, if at any time prior to initiation of the initial fill for the wash cycle opening of the door is detected using the door switch and the addition of other articles is detected using the weight sensor, control may pass to block 310 to capture additional color composition data (e.g., one or more images and/or a video), and generally with the color composition capture occurring once image stability has been detected. Control the returns to block 304 to reanalyze all of the color composition data and potentially recharacterize the load based upon the new color composition data.

Figure 10A:
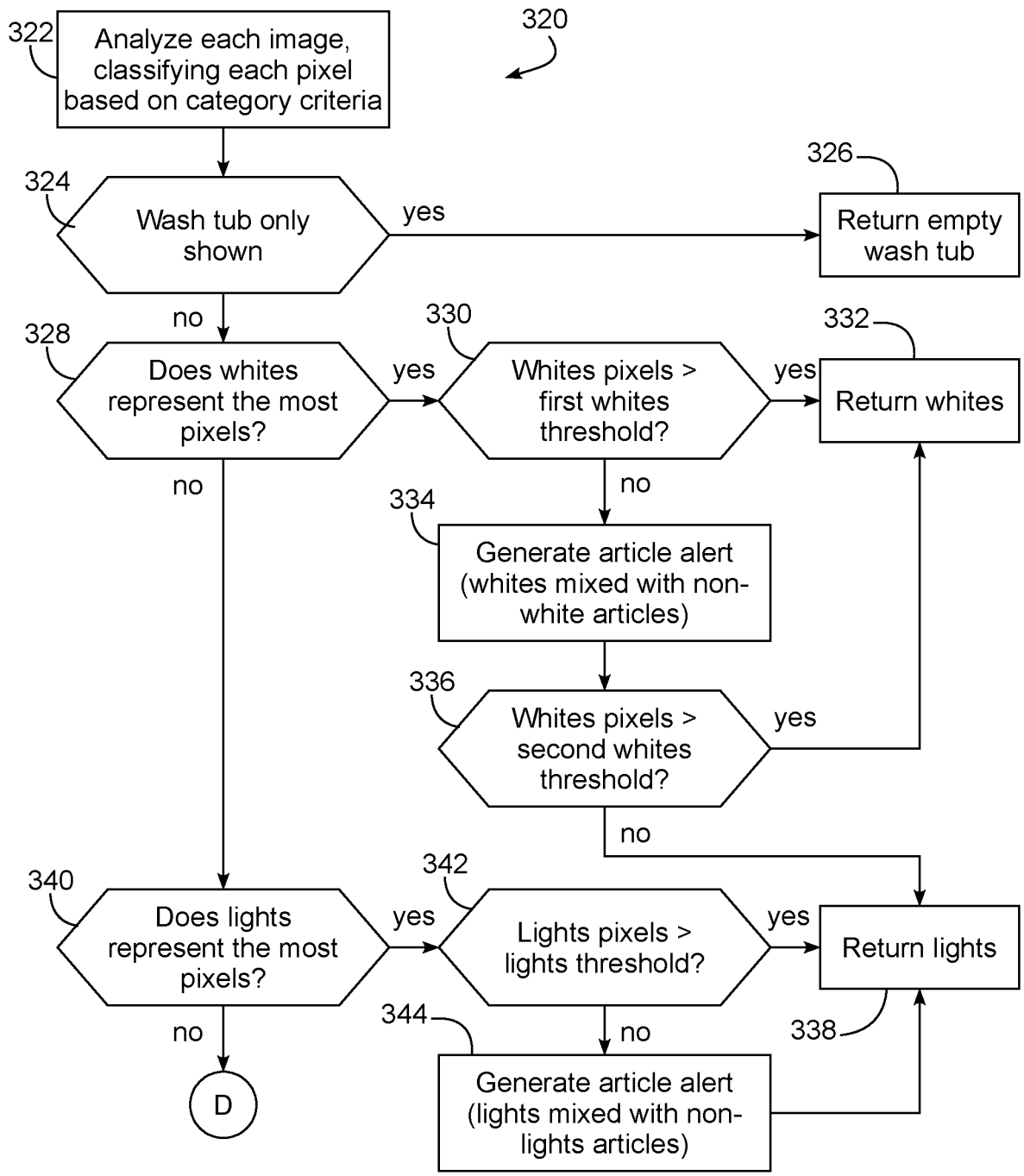
FIGS. 10A-10B illustrate a flowchart for an example sequence of operations for performing the image analysis referenced in FIG. 9C.
Figure 10B:
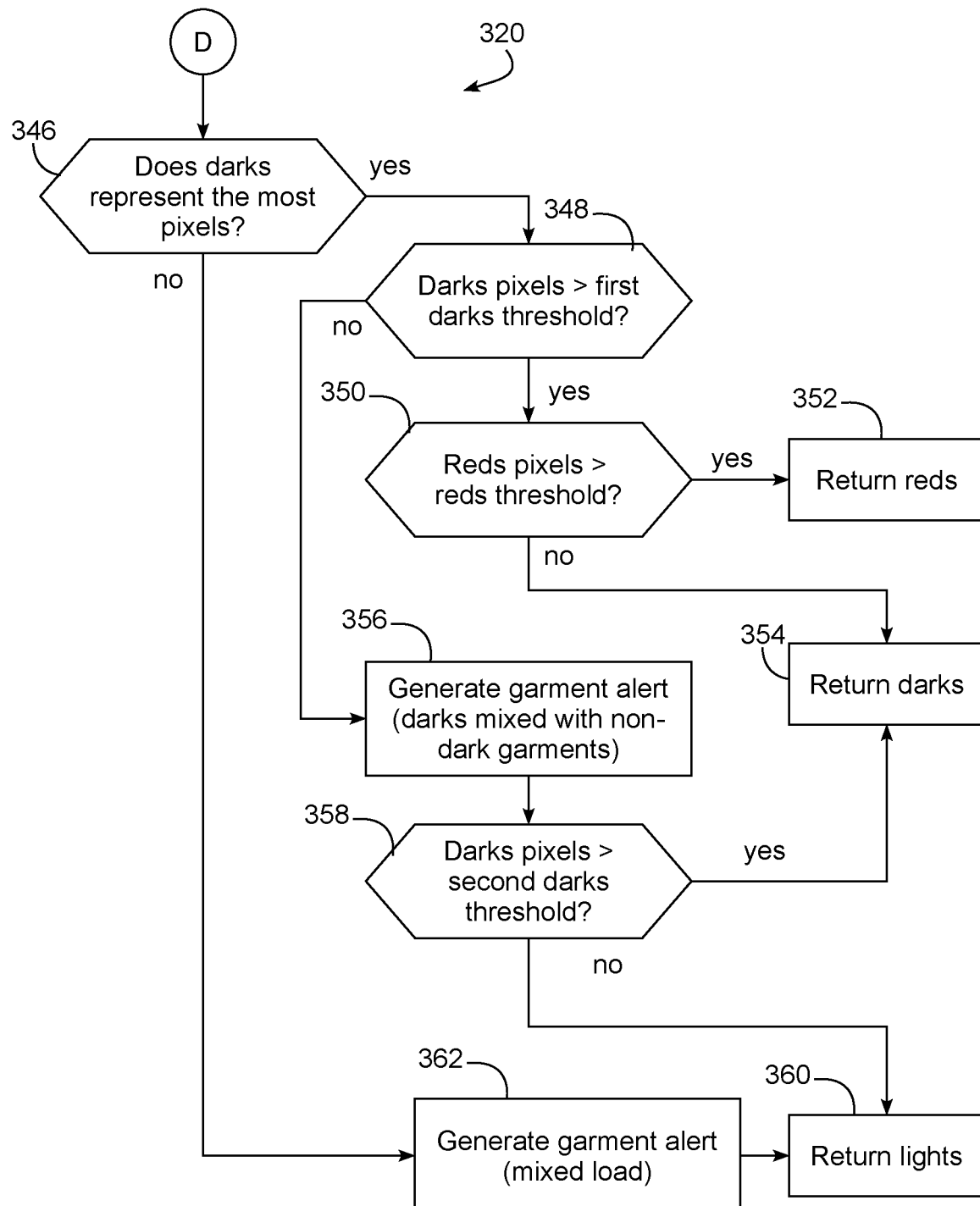

Now turning to FIGS. 10A-10B, one example sequence of operations 320 suitable for implementing a color decision algorithm consistent with some embodiments of the invention is illustrated. In particular, in one embodiment consistent with the invention, and as illustrated in block 322, the pixels in each captured image may be analyzed and each assigned or classified into one of a plurality of color categories, e.g., a whites category, a lights category, a darks category, a reds category and a "wash tub" category (representing a pixel that is associated with the structure of the wash tub itself (e.g., the wash tub and/or any wash basket, or any agitator therein, and then the number of pixels assigned to each color category may be determined and used to characterize the overall load. The categorization may be performed, for example, using one or more color categorization criteria that define the membership of a pixel within a particular color category, and against which the color composition data for the pixel may be tested, e.g., based on brightness and/or color cast, individual color intensities, hue, lightness and/or other imaging data.

In one example embodiment, thresholds may be used to categorize a load based upon the numbers of pixels assigned to each color category, e.g., using a whites threshold, a lights threshold, a darks threshold and a reds threshold that, when exceeded, indicates that the load is predominantly of that color load type. The thresholds may be based on pixel counts in some embodiments, or based on other criteria, e.g., percentages, in other embodiments. In addition, as will be discussed in greater detail below, thresholds may also be used to identify outlier articles and trigger the generation of alerts and/or changing the load type to a different load type, e.g., a mixed load type, whenever pixels associated with an outlier article exceed a particular threshold.

Thus, for example, block 324 may first determine whether the captured images show only an empty wash tub, i.e., where all or a predominant number of pixels are assigned to a wash tub category. If so, control passes to block 326, and an empty wash tub result is returned.

If not, block 328 initiates a decision tree that selects various results primarily based upon which among the different color categories is most represented in the categorized pixels. In particular, block 328 determines whether whites represent the most pixels, and if so, passes control to block 330 to test whether the number or percentage of whites pixels exceeds a first whites threshold. If so, control passes to block 332 to return a whites color load type. If not, however, control passes to block 334 to generate an article alert that indicates to the user that the whites load is mixed with one or more non-white articles. Control then passes to block 336 to determine if the whites pixels exceed a second whites threshold, which is generally lower than the first whites threshold. If so, control passes to block 332 to return a whites color load type; however, if not, control instead passes to block 338 to instead return a lights color load type, thereby automatically selecting a different load type from the whites load type as a result of the detection of the outlier article(s).

Returning to block 328, if whites does not represent the most pixels, control passes to block 340 to determine whether lights represent the most pixels, and if so, passes control to block 342 to test whether the number or percentage of white pixels exceeds a lights threshold. If so, control passes to block 338 to return a lights color load type. If not, however, control passes to block 344 to generate an article alert that indicates to the user that the lights load is mixed with one or more non-lights articles. Control then passes to block 338 to return the lights color load type.

Returning to block 340, if lights does not represent the most pixels, control passes to block 346 to determine whether darks represent the most pixels, and if so, passes control to block 348 to test whether the number or percentage of darks pixels exceeds a first darks threshold. If so, control passes to block 350 to test whether the number or percentage of reds pixels exceeds a reds threshold, and if so, passes control to block 352 to return a reds color load type. If not, however, control passes to block 354 to return a darks color load type.

Returning to block 348, if the first darks threshold is not met, control passes to block 356 to generate an article alert that indicates to the user that the darks load is mixed with one or more non-darks articles. Control then passes to block 358 to determine if the darks pixels exceed a second darks threshold, which is generally lower than the first darks threshold. If so, control passes to block 354 to return a darks color load type; however, if not, control instead passes to block 360 to instead return a lights color load type, thereby automatically selecting a different load type from the darks load type as a result of the detection of the outlier article(s).

Returning to block 346, if darks does not represent the most pixels (indicating that no one color category is predominant), control passes to block 362 to generate an article alert that indicates to the user that the load is a mixed load. Control then passes to block 360 to return a lights color load type.

It will be appreciated that various numbers and combinations of color categories, thresholds, category criteria, etc. may be used in various embodiments. In addition, other types of sensors may be used in connection with color composition characterization, e.g., using multiple load cells or other weight sensors, using other color detection sensors, omitting or using various types of lights, using image analysis rather than weight to sense articles after being added to a wash tub, using a proximity sensor to wake up from a sleep state, etc.

Further, implementation of a color decision algorithm may vary in different embodiments, with characteristics of the algorithm determined empirically in some embodiments, and based on various criteria, threshold, etc. Furthermore, it will be appreciated that trained machine learning models may be used in some embodiments to characterize pixels, characterize loads and/or identify outlier articles. Therefore, the invention is not limited to the specific algorithm implementations discussed herein.

Moreover, it will be appreciated that the generation of article alerts and/or the selection of alternate color load types or otherwise modifying operational settings to account for detected outlier articles may be implemented in various manners. Generally, the detection of the outlier articles may be performed during a loading phase of the wash cycle, and concurrently with the categorization of a load, and thus for both categorization and outlier article detection, it may be desirable in some embodiments to instruct or educate a user to add articles progressively to the wash tub, rather than add the entire load at once, thereby enabling additional images of the load to be captured, and increasing the amount of color composition data available for analysis.

Further, it should be appreciated that the generation of article alerts and/or the selection of alternate color load types or otherwise modifying operational settings to account for detected outlier articles may be based in part on the aforementioned failure to meet certain thresholds associated with particular color categories, even when a majority of pixels is associated with those particular color categories. In other embodiments, however, separate criteria may be used to detect outlier articles, e.g., by determining when the number of pixels assigned to a particular color category exceeds a threshold when the number of pixels assigned to a different color category also exceeds some threshold (or, in some cases, is still determined to be the color category having the greatest number of assigned pixels). Other manners of detecting the presence of outlier articles based on counts of pixel assignments will be appreciated by those of ordinary skill having the benefit of the instant disclosure, so the invention is not limited to the specific detection criteria disclosed herein.

Laundry Washing Machine Calibration

It will next be appreciated that the aforementioned absorption-based and color-based load categorization functionality may be based on various factors that can vary from installation to installation of a laundry washing machine. For the absorption-based load categorization functionality described herein, for example, it may be desirable to correct for the actual water pressure of a water supply to which the laundry washing machine is connected, particularly where a fluid level sensor, rather than a flow sensor, is used to determine the amount of water added to a wash tub, as the water pressure of the water supply can affect the amount of time it takes to reach a predetermined fill level. It therefore may be desirable to perform a calibration process in some embodiments to generate a calibration factor associated with the water pressure of the water supply that may be used to correct for water pressure variations in different installations. As will become more apparent below, a calibration process in some embodiments may include controlling a water inlet to dispense water into a wash tub while the wash tub is empty and determining a time to reach a predetermined fluid level in the wash tub, and optionally repeating the fill multiple times and averaging the results. From the calculated time, a water pressure may be determined and used in the aforementioned absorption-based characterization of a load.

For the color-based load characterization functionality described herein, it may be desirable to correct for ambient lighting conditions within the vicinity of a laundry washing machine, which may be used, for example, to set the various criteria used to assign pixels in captured color composition data to various color categories. It will be appreciated, for example, that a laundry washing machine installed in a dark closet or basement and/or using relatively dim and warm lighting will present a substantially different surrounding environment than a laundry washing machine installed in a laundry room that is brightly-lit with cool color temperature lighting (as, for example, light colored articles would generally appear darker in a dark closet than if in a bright laundry room), and as such, by calibrating the color detection sensor to account for the actual ambient lighting conditions may result in more consistent color categorization from machine to machine.

In addition, for one or both of absorption-based and color-based load characterization, it may be desirable to additionally correct for wash tub weight, e.g., by sensing a tare weight value for the wash tub while the wash tub is empty. In particular, when a weight sensor is implemented as a load cell that is offset from an axis of rotation of a wash basket in the wash tub, it may be desirable to compensate for any manufacturing variations and capture multiple weight readings during rotation of the wash basket in the wash tub and while the wash tub is empty for use as an empty wash tub weight, which can not only be used for sensing the weight of the overall load, but also can be used to detect whether or not a laundry washing machine is actually empty at startup.

In each of these instances, the calibration factors generated as a result of the calibration processes may be used subsequently in the control over a wash cycle, e.g., by setting one or more operational settings for the wash cycle. Further, while the hereinafter-described calibration process includes all three of the aforementioned calibrations, it will be appreciated that each of the calibrations may be performed separately in different embodiments, so the invention is not limited to a calibration process that performs all three calibrations. Moreover, while the herein-described calibration process is described as being performed after the initial installation of a laundry washing machine, it will be appreciated that any of the aforementioned calibrations may also be performed later throughout the lifetime of a laundry washing machine, e.g., on a preprogrammed schedule or in response to manual user or service personnel instruction. Further, some calibration operations may be performed at the start of an individual wash cycle in some embodiments, e.g., to capture images at the initial warm up of a color detection sensor upon the opening of a door of a laundry washing machine.

Figure 11A:
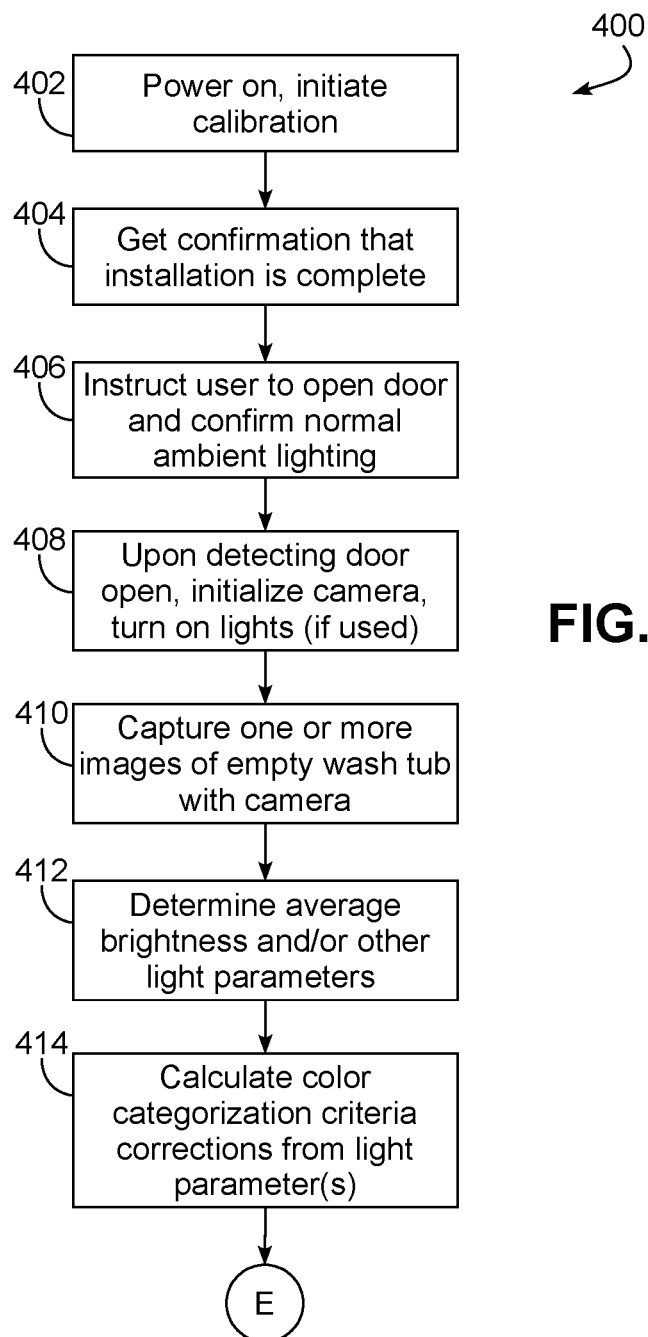
FIGS. 11A-11C illustrate a flowchart for an example sequence of operations for calibrating the laundry washing machine of FIG. 1.
Figure 11B:
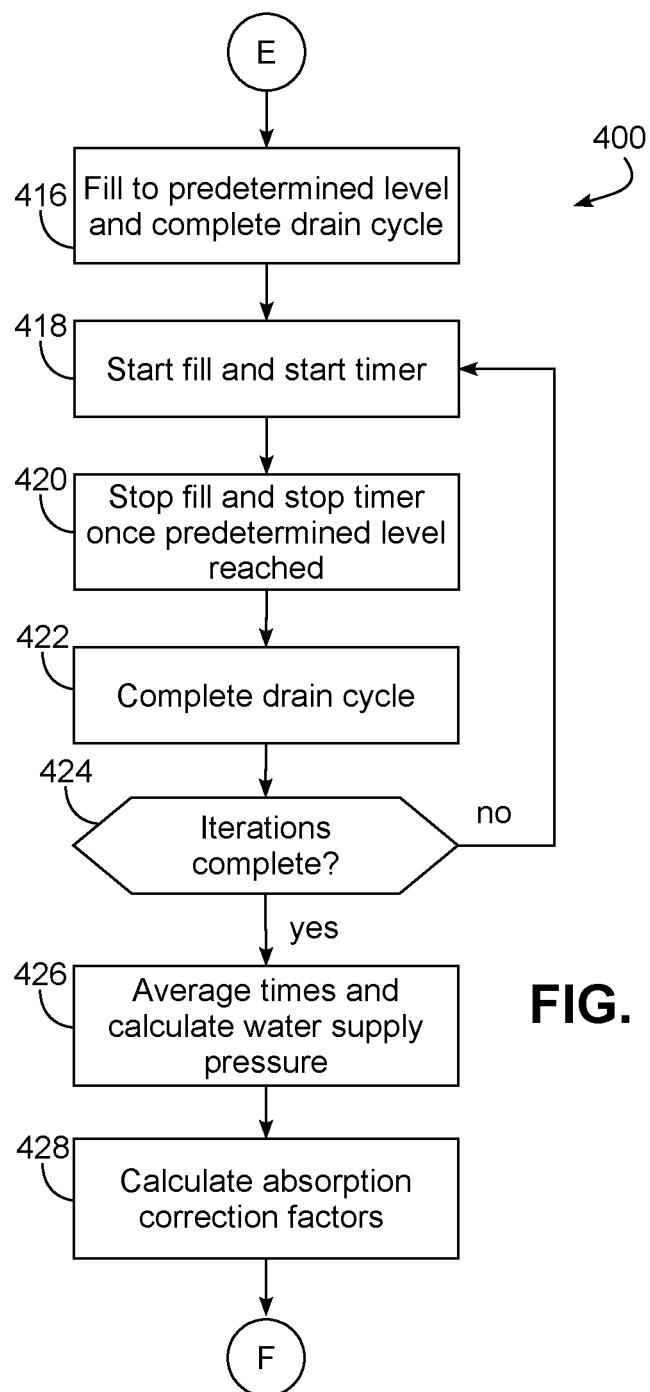
Figure 11C:
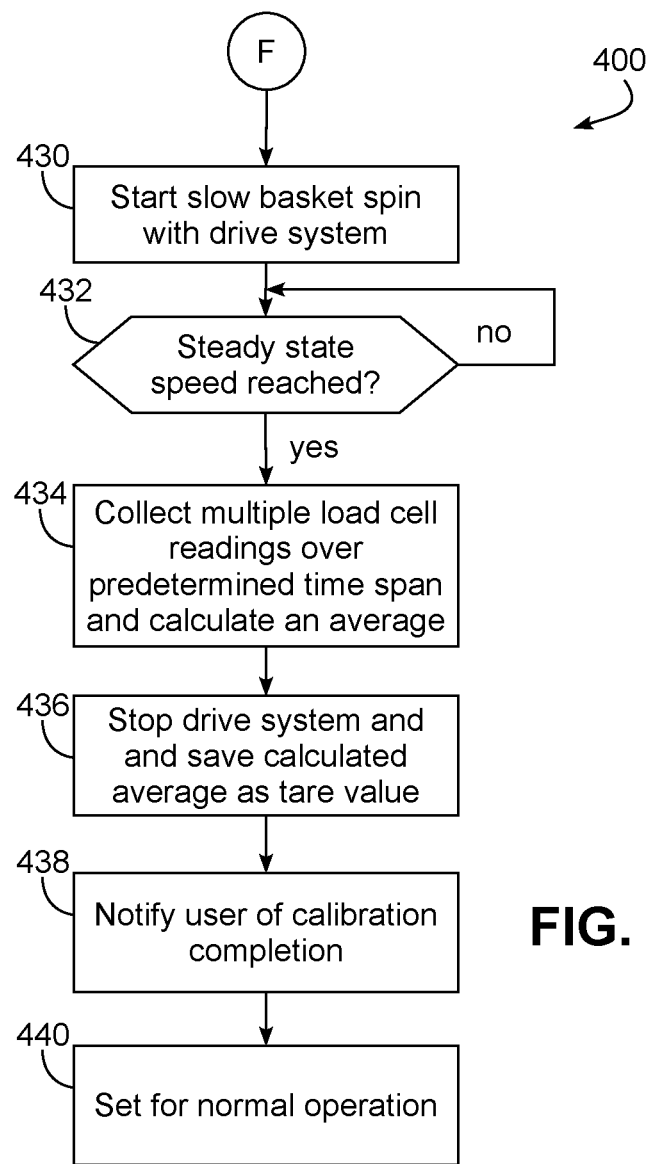

Now turning to FIGS. 11A-11C, these figures illustrate an example sequence of operations 400 for performing a calibration operation on a laundry washing machine consistent with some embodiments of the invention. Sequence 400, for example, may be initiated upon power on of the laundry washing machine, as illustrated in block 402, and may, for example, use a user interface such as a touch-screen display to both instruct a user and receive user input at various points in the process. In block 404, for example, the user may be requested to user confirm that the physical installation is complete and that the machine is ready to be calibrated and used, e.g., confirming that the machine is in its desired location. In some embodiments, a user may also be requested to confirm that the machine is connected to the water supply and drain.

Next, in block 406, the user may be instructed to open the door to the laundry washing machine and confirm that the ambient lighting is normal for the installation location. Then, in block 408, upon detecting the door open, the camera or other color detection sensor may be initialized and (if used) any lights may be turned on, and in block 410 one or more images of the empty wash tub may be captured. In addition, in some embodiments, it may be desirable to instruct a user to vary lighting conditions and capture images in these varying lighting conditions, e.g., to cover the range of lighting conditions that may be experienced during the normal course of use of the laundry washing machine.

From the one or more images, an average brightness and/or other light parameters may be determined from the images in block 412, and in block 414 the average brightness and/or other light parameters such as average color cast may be used to calibrate the color-based characterization process, e.g., to effectively adjust the response of a color decision algorithm. In some embodiments, for example, correction values may be determined in each of the red, green and blue space, and color composition data captured during subsequent wash cycles may be adjusted using these correction values. The adjusted color composition data may then be compared against thresholds assigned to different color categories (e.g., thresholds based on average brightness of color). In some embodiments, for example, color composition data may be captured and parameters of ambient light may be measured based on the average color of the captured data. The categories may then be adjusted based on the brightness of the lighting, which may shift ranges assigned to different categories based on such adjustments. Color cast removal may also be performed with parameter settings of the color detection sensor and image analysis in some embodiments.

In some embodiments, in addition to or in lieu of adjusting the color composition data itself, the various color categorization criteria or thresholds used to categorize a load may be adjusted based on calibration to effectively adjust the response of the color decision algorithm. In one embodiment, for example, color categories may be discriminated between one another based on thresholds of brightness and/or color cast, and an average brightness and/or color cast determined during the calibration process may be used to adjust these thresholds. Other manners of adjusting the response of a color decision algorithm based upon calibration data collected from ambient lighting conditions may be used in other embodiments, as will be appreciated by those of ordinary skill in the art having the benefit of the instant disclosure.

Next, turning to FIG. 11B, after calibrating for ambient light conditions, control may pass to block 416 to perform a calibration process for water supply pressure. In particular, block 416 may cause the laundry washing machine to turn on the water inlet to fill to a predetermined level and then perform a drain cycle to empty the wash tub. Doing so enables excess air to be removed from the pump and tubing that could otherwise impact the calibration process.

Next, in block 418, another fill operation commences and a timer is started to determine the time required to reach a predetermined level in the wash tub as sensed by the fluid level sensor. Once that predetermined level is sensed, block 420 stops the fill and stops the timer, and additionally records the elapsed time, and block 422 completes a drain cycle to drain the water from the wash tub. Block 424 then returns control to block 418 to repeat this process for a plurality of iterations (e.g., 3-7 in the illustrated embodiment), and once the desired number of iterations have been completed, block 426 averages the recorded times and calculates a water supply pressure therefrom.

While a water supply pressure may be calculated from the elapsed times in a number of manners, in one embodiment the water supply pressure may be calculated using the formula:

$$\lim_{x \to n} P = psiLevel(x) + b$$

where P is the pressure of the water supply, psiLevel is the function in which time x grows with water level, and b is the y intercept. psiLevel in some embodiments may be determined empirically for a particular laundry washing machine design.

In some embodiments, a precise water pressure may not be required, and instead a series of thresholds may be used to determine a water pressure range, e.g., to the nearest 1 psi or nearest 5 psi. Thus, if the average elapsed time is below a first threshold, this may signify a water pressure of about 40 psi, while being below a second threshold may signify a water pressure of about 35 psi, while being below a third threshold may signify a water pressure of about 30 psi, etc.

Once the water pressure is determined the water pressure may be used to calculate a set of absorption correction factors in block 428. For example, in the embodiment described above, measured sense, fill and peak times are used to characterize a load, and complementary sense, fill and peak calibration factors may be calculated for use with these measured times. In one example embodiment, each calibration factor may take the form of a logarithmic line, e.g., y=m*ln(x)+b, where y represents a calibration factor for one of the sense, fill and peak time variables, m represents the rate at which it is increased, x represents the measured water pressure, and b represents a y intercept of the function, resulting in three calibration factors as illustrated below:

Sense calibration factor=$a$*ln(waterPressure)+$x$

Fill calibration factor=$b$*ln(waterPressure)+$y$

Peak calibration factor=$c$*ln(waterPressure)+$z$

It will be appreciated that these calibration factors may be applied to the measured sense, fill and peak times in some embodiments, or may alternatively be applied to the thresholds that are used to discriminate between different load types. It will also be appreciated that the calibration factors may be empirically determined in some embodiments, and in some embodiments, other equations, e.g., polynomial, linear or other types of non-linear equations may be used to represent the calibration factors. In other embodiments, calibration factors may be based on fuzzy logic or neural network-derived values. Other manners of mapping the average elapsed time to water pressure and/or water pressure to calibration factors will be appreciated by those of ordinary skill having the benefit of the instant disclosure, and further it will be appreciated that average elapsed time may be mapped directly to calibration factors without explicitly calculating a water pressure in some embodiments.

Next, turning to FIG. 11C, after calibrating for water pressure, control may pass to block 430 to perform a calibration process for wash tub weight. As noted above, in some embodiments a single load cell offset from a rotational axis of the wash basket may be used to sense weight, and thus, it is possible for the weight sensed by the load cell to vary with the rotational position of any components within the wash basket. As such, it may be desirable in some embodiments to spin or rotate the wash basket while sensing weight and average the results in order to obtain a rotational position-invariant tare value.

In particular, block 430 may cause the wash basket in the wash tub to slowly spin using the drive system, and block 432 may wait for a steady state speed to be reached. Once that steady state speed has been reached, block 434 may collect multiple load cell readings over a predetermined time span and calculate an average thereof. Block 436 may then stop the drive system and save the calculated average as a tare value corresponding to the weight of the empty wash tub.

Thereafter, block 438 may notify the user of the completion of the calibration process, and block 440 may set the laundry washing machine to a "normal operation" state, indicating that the laundry washing machine is ready for normal service.

It will be appreciated that it may also be desirable to run one or more of the aforementioned calibrations at a later time during the lifetime of the laundry washing machine, and that in particular it may be desirable to periodically perform weight sensor calibration on a relatively frequent basis, e.g., prior to every wash cycle in some embodiments, to check whether the weight of the wash tub has been affected by any orientation change.

Various additional modifications may be made to the illustrated embodiments consistent with the invention. Therefore, the invention lies in the claims hereinafter appended.

What is claimed is:

1. A laundry washing machine, comprising:
   a wash tub disposed within a housing;
   a color detection sensor positioned to capture color composition data of a load of articles over time as the load of articles is added to the wash tub; and
   a controller coupled to the color detection sensor and configured to initiate the capture of the color composition data with the color detection sensor as the load of articles is added to the wash tub, the controller further configured to initiate a color decision algorithm to characterize the captured color composition data by assigning each of a plurality of pixel values in the captured color composition data to one of a plurality of color categories;
   wherein the controller is further configured to generate an alert in response to detection of one or more outlier articles from the load of articles added to the wash tub in the categorized color composition data to notify the user of the presence of the one or more outlier articles in the load.

2. The laundry washing machine of claim 1, wherein the controller is configured to initiate the color decision algorithm by executing at least a portion of the color decision algorithm.

3. The laundry washing machine of claim 1, wherein the controller is configured to initiate the color decision algorithm by communicating data from the plurality of color composition data captures to a remote device that executes at portion of the color decision algorithm, and wherein the controller is further configured to receive result data associated with the color decision algorithm from the remote device.

4. The laundry washing machine of claim 1, wherein the color decision algorithm is configured to assign each of the plurality of pixels in the captured color composition data to one of the plurality of color categories by comparing color data for each pixel against a plurality of thresholds associated with the plurality of color categories.

5. The laundry washing machine of claim 1, wherein the color decision algorithm is configured to determine a number of pixels in the captured color composition data that are assigned to each of the plurality of color categories, and to characterize the load of articles based upon the determined numbers of pixels.

6. The laundry washing machine of claim 5, wherein the color decision algorithm is configured to characterize the load of articles based upon the determined numbers of pixels by comparing the determined numbers of pixels against thresholds associated with one or more of the plurality of color categories.

7. The laundry washing machine of claim 6, wherein the color decision algorithm is configured to detect the one or more outlier articles based upon a determined number of pixels assigned to a different color category from that to which the load of articles is assigned by comparing the determined number of pixels assigned to the different color category from that to which the load of articles is assigned to a threshold separate from that used for the color category to which the load of articles is assigned.

8. The laundry washing machine of claim 6, wherein the color decision algorithm is configured to detect the one or more outlier articles based upon a majority of the determined numbers of pixels being assigned to a first color category but the determined number of pixels assigned to the first color category not meeting a threshold associated with the first color category.

9. The laundry washing machine of claim 8, wherein:
the plurality of color categories to which the pixels are assigned includes a whites color category, a lights color category, and a darks color category;
the color decision algorithm is configured to characterize the load of articles based upon the determined numbers of pixels by:
characterizing the load of articles as a whites load in response to a majority of the determined numbers of pixels being assigned to the whites color category and the determined number of pixels assigned to the whites color category meeting a whites threshold;
characterizing the load of articles as a lights load in response to a majority of the determined numbers of pixels being assigned to the lights color category and the determined number of pixels assigned to the lights color category meeting a lights threshold; and
characterizing the load of articles as a darks load in response to a majority of the determined numbers of pixels being assigned to the darks color category and the determined number of pixels assigned to the darks color category meeting a darks threshold; and
the color decision algorithm is configured to detect the one or more outlier articles based upon the determined numbers of pixels by:
detecting the one or more outlier articles in response to a majority of the determined numbers of pixels being assigned to the whites color category but the determined number of pixels assigned to the whites color category not meeting the whites threshold;
detecting the one or more outlier articles in response to a majority of the determined numbers of pixels being assigned to the lights color category but the determined number of pixels assigned to the lights color category not meeting the lights threshold; and
detecting the one or more outlier articles in response to a majority of the determined numbers of pixels being assigned to the darks color category and the determined number of pixels assigned to the darks color category not meeting the darks threshold.

10. The laundry washing machine of claim 1, wherein the controller is configured to generate the alert by generating an audible and/or visual alert with a user interface of the laundry washing machine.

11. The laundry washing machine of claim 1, wherein the controller is further configured to pause a wash cycle in connection with generating the alert to give the user an opportunity to remove the one or more outlier articles, and to proceed with the wash cycle in response to user input confirming that the one or more articles have been removed.

12. A laundry washing machine, comprising:
a wash tub disposed within a housing;
a color detection sensor positioned to capture color composition data of a load of articles over time as the load of articles is added to the wash tub; and
a controller coupled to the color detection sensor and configured to initiate the capture of the color composition data with the color detection sensor as the load of articles is added to the wash tub, the controller further configured to initiate a color decision algorithm to characterize the captured color composition data by assigning each of a plurality of pixel values in the captured color composition data to one of a plurality of color categories;
wherein the color decision algorithm is configured to automatically select a first color load type for the load based upon the categorized color composition data, and to select a second color load type for the load over the first color load type in response to detection that one or more outlier articles are present in the load of articles added to the wash tub in the categorized color composition data.

13. The laundry washing machine of claim 12, wherein the controller is further configured to generate an alert in response to the detection of the one or more outlier articles from the load of articles added to the wash tub in the categorized color composition data.

14. The laundry washing machine of claim 12, wherein the color decision algorithm is configured to select the first color load type using a first threshold associated with load type characterization and select the second color load type over the first color load type using a second threshold associated with identifying outlier articles.

15. The laundry washing machine of claim 12, wherein the color decision algorithm is configured to determine a number of pixels in the captured color composition data that are assigned to each of the plurality of color categories, and to characterize the load of articles based upon the determined numbers of pixels.

16. The laundry washing machine of claim 15, wherein the color decision algorithm is configured to characterize the load of articles based upon the determined numbers of pixels by comparing the determined numbers of pixels against thresholds associated with one or more of the plurality of color categories.

17. The laundry washing machine of claim 16, wherein the color decision algorithm is configured to select the second color load type for the load over the first color load type based upon a determined number of pixels assigned to a different color category from that associated with the first color load type.

18. The laundry washing machine of claim 16, wherein the color decision algorithm is configured to detect the one or more outlier articles based upon a majority of the determined numbers of pixels being assigned to a first color category but the determined number of pixels assigned to the first color category not meeting a threshold associated with the first color category.

19. The laundry washing machine of claim 18, wherein:
the plurality of color categories to which the pixels are assigned includes a whites color category, a lights color category, and a darks color category;
the color decision algorithm is configured to characterize the load of articles based upon the determined numbers of pixels by:
characterizing the load of articles as a whites load in response to a majority of the determined numbers of pixels being assigned to the whites color category and the determined number of pixels assigned to the whites color category meeting a whites threshold;
characterizing the load of articles as a lights load in response to a majority of the determined numbers of pixels being assigned to the lights color category and the determined number of pixels assigned to the lights color category meeting a lights threshold; and characterizing the load of articles as a darks load in response to a majority of the determined numbers of pixels being assigned to the darks color category and the determined number of pixels assigned to the darks color category meeting a darks threshold; and the color decision algorithm is configured to detect the one or more outlier articles based upon the determined numbers of pixels by:

detecting the one or more outlier articles in response to a majority of the determined numbers of pixels being assigned to the whites color category but the determined number of pixels assigned to the whites color category not meeting the whites threshold;

detecting the one or more outlier articles in response to a majority of the determined numbers of pixels being assigned to the lights color category but the determined number of pixels assigned to the lights color category not meeting the lights threshold; and detecting the one or more outlier articles in response to a majority of the determined numbers of pixels being assigned to the darks color category and the determined number of pixels assigned to the darks color category not meeting the darks threshold.

20. The laundry washing machine of claim 19, wherein the whites threshold is a first whites threshold and the darks threshold is a first darks threshold, and wherein the color decision algorithm is further configured to:

characterize the load of articles as a lights load in response to a majority of the determined numbers of pixels being assigned to the whites color category but the determined number of pixels assigned to the whites color category not meeting a second whites threshold; and characterize the load of articles as a lights load in response to a majority of the determined numbers of pixels being assigned to the darks color category but the determined number of pixels assigned to the darks color category not meeting a second darks threshold.

* * * * *